(12) United States Patent
Brenner et al.

(10) Patent No.: US 9,542,060 B1
(45) Date of Patent: Jan. 10, 2017

(54) USER INTERFACE FOR ACCESS OF CONTENT

(71) Applicant: Amazon Technologies, Inc., Reno, NV (US)

(72) Inventors: Andrew S. Brenner, Sunnyvale, CA (US); Jared T. Benson, San Francisco, CA (US); Eric A. Breitbard, Oakland, CA (US); Michael Patrick Bauerly, Sunnyvale, CA (US); Vincent G. Uttley, Los Altos, CA (US); Panos Vassiliadis, Fremont, CA (US); Lowell W. Goss, Sunnyvale, CA (US); Nathan Daniel Cox, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 288 days.

(21) Appl. No.: 13/713,525

(22) Filed: Dec. 13, 2012

(51) Int. Cl.
*G06F 3/00* (2006.01)
*G06F 3/048* (2013.01)

(52) U.S. Cl.
CPC .................................. *G06F 3/048* (2013.01)

(58) Field of Classification Search
CPC ...................................................... G06F 3/0237
USPC .......................................................... 715/789
See application file for complete search history.

(56) References Cited

U.S. PATENT DOCUMENTS

| | | | |
|---|---|---|---|
| 2009/0133059 A1* | 5/2009 | Gibbs et al. | ..................... 725/34 |
| 2010/0153831 A1* | 6/2010 | Beaton | ........................... 715/201 |
| 2012/0221952 A1* | 8/2012 | Chavez | .................. G06Q 10/00 715/733 |
| 2013/0042007 A1* | 2/2013 | Linton et al. | ................. 709/226 |
| 2014/0089017 A1* | 3/2014 | Klappert | ................ G06Q 10/02 705/5 |

* cited by examiner

*Primary Examiner* — Omar Abdul-Ali
(74) *Attorney, Agent, or Firm* — Sutherland Asbill & Brennan LLP

(57) ABSTRACT

User interfaces for selecting content for presentation or other actions is described in this disclosure. Using a small number of input controls a user may quickly and easily navigate content available for presentation from one or more content providers. Additional information may be presented to the user to facilitate selection of the content. Users may select content using one or more of a graphical user interface, or voice input.

27 Claims, 20 Drawing Sheets

USER INTERFACE FOR ACCESS OF CONTENT

BACKGROUND

A wide variety of content is available to users for access electronically. This content may include television programming, eBooks, music, movies, games, and so forth. The content may be delivered using broadcast, cable, satellite, Internet, playback by streaming or retrieved from a local media device such as a digital versatile disk ("DVD"), compact disc ("CD"), flash memory, hard disk drive, and so forth. Users may consume this content by watching, listening, reading, playing, and so forth.

Figure 1:
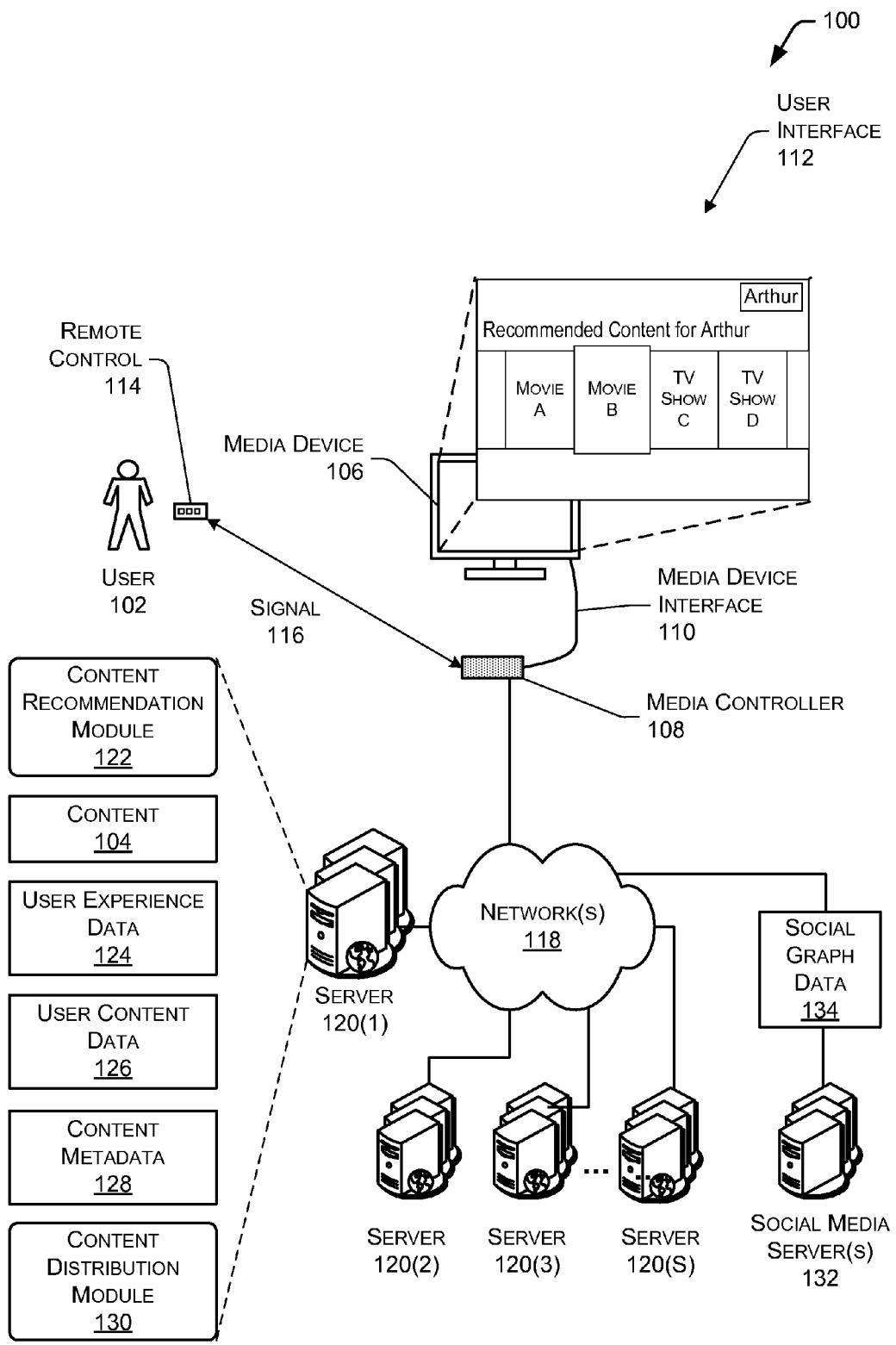
FIG. 1 illustrates a system configured to provide a user interface.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Content available to users for access electronically has traditionally been cumbersome to select for consumption. A user wishing to enjoy content such as television programming, eBooks, music, movies, games, and so forth has traditionally been presented with user interfaces calling for numerous actions in order to select a content provider and then a piece of content. When combined with the large array of content providers and content which is available for users to access, the overall user experience may be cumbersome.

Presented in this disclosure is a user interface with associated sub-interfaces configured to improve the user experience during the user's selection and consumption of content. The user interface may be presented by a media controller or other device. The user interface is configured to present content which may be of particular interest to the user, provide information about the content, present the content, and so forth. The user interface described herein may be provided by a media controller, a server, or both.

The user interface may be configured to provide elements and information which are tailored for a given user or group of users and accept user input responsive to the elements and information. The user interface may include one or more graphical, audible, or haptic elements.

A profile may be associated with a particular user or group of users. For example, a family may include the users of Arthur, Bea, and Charles. Each of these users may have a particular user profile which is associated with their particular consumption patterns, tastes, preferences, and so forth. Group profiles may be defined, such as a family group profile which reflects the consumption patterns and so forth of the family members when consuming content together.

A primary user interface is configured to provide information indicating which user profile is currently active and what pieces of content which are associated with that user profile. The primary user interface may include information about featured content, promotional content, recommended content, last content in-progress, recent contact, one or more watchlists, and so forth. The information to be presented may be determined at least in part by the server. The server may generate content recommendations for featured content, promotional content, and so forth which are associated with a particular user or group of users accessing the media controller. Rather than navigating an extensive hierarchy of content providers, categories, titles, episodes, and so forth, the user experience provided by the user interface described herein is a presentation of content which is or may be of interest to the particular user or group of users associated with the media controller.

The user interfaces described in this disclosure are configured to simplify user interaction by providing content relevant to the user and minimizing data entry and navigation inputs. Some actions in the user interface may be initiated by the user providing an explicit input. For example, the user may use an "enter" key on a remote control to initiate presentation of additional content. Other actions in the user interface may be initiated by an implicit action, such as the user waiting or dwelling at a particular point in the user interface. For example, the user dwelling for more than a threshold period of time when the user interface is focused on a particular piece of previewed content may result in details about that piece of content being presented without explicit input from the user.

The term "focus" as used in this disclosure indicates a particular element of the user interface for which input which is received is associated. For example, a text entry box which is in focus in the user interface will be the one which accepts input such as recognized speech or text entered via a keypad. In some implementations the element in focus may be indicated by a change in size, shape, color, border, cursor, pointer, and so forth. The term "element" as used in this disclosure indicates windows, menus, icons, controls, text, or other information or interaction tools which are available to the user to manipulate, experience, or otherwise use the user interface.

By providing the user interface which is tailored to the particular user profile and which provides associations between content, the user experience is simplified and improved. The user may quickly move among different pieces of content, and easily select content of interest for consumption.

Illustrative System

FIG. 1 illustrates a system 100 configured to provide a user interface for consumption of content. A single user 102 is shown, however more than one user 102 may consume a same piece of content 104 at a given time. For example, several users 102 may watch a movie or listen to a concert together.

The content 104 may include television programming, movies, eBooks, audiobooks, music, audio, games, and so forth. The content 104 may be delivered using broadcast, cable, satellite, network such as the Internet, and so forth. The content 104 may also be previously stored. For example, the content 104 or a portion thereof may be stored on a hard disk drive or flash memory, on a digital versatile disk ("DVD") or compact disc ("CD"), and so forth.

The system 100 may include one or more media devices 106. These media devices 106 may include televisions, display devices, broadcast satellite receivers, broadcast radio receivers, cable television interface boxes, game consoles, DVD players, CD players, and so forth. For example, as shown here the system 100 comprises a television media device 106.

The media devices 106 may be coupled to one another, to a media controller 108, or to a combination thereof with a media device interface 110. The media device interface 110 may comprise a high-definition multimedia interface ("HDMI") connection using a feature set such as the Consumer Electronics Control ("CEC"), local area network ("LAN"), wireless local area network ("WLAN"), personal area network ("PAN") such as Bluetooth™ or ZigBee, and so forth. In some implementations, one or more of the media devices 106 and the media controller 108 may be integrated into a common device or chassis.

The media controller 108 may be configured to provide a user interface 112 to the user 102. The media controller 108 may receive status information about the one or more media devices 106 using the media device interfaces 110, issue commands to one or more of the media devices 106, provide content for presentation, and so forth.

A remote control 114 may be used in conjunction with the media controller 108. The remote control 114 may be a portable device configured to accept and provide user input to the media controller 108. The remote control 114 may also be configured to produce output such as visual, audible, haptic, and so forth. The remote control 114 may be provided in a variety of form factors such as a tablet, slate, generally rectangular cuboid configured for single-handed use, wand, and so forth. Other form factors, sizes, and so forth may be used.

The remote control 114 is configured to communicate with the media controller 108. Communication between the remote control 114 and the media controller 108 may use a wired or wireless connection exchanging one or more signals 116. The wired connection may comprise an optical fiber, electronic conductor, or other physical coupling between the remote control 114 and the media controller 108. The wireless connection may comprise optical, acoustic, electromagnetic, or other means to transmit information between the remote control 114 and the media controller 108. In one implementation the signals 116 are radio frequency ("RF") signals.

Communication between the remote control 114 and the media controller 108 may use a proprietary protocol, standard protocol, or a combination thereof. For example, the remote control 114 and the media controller 108 may comprise RF interfaces compliant with the Bluetooth™ standard. Communication between the remote control 114 and the media controller 108 may be bidirectional or unidirectional. In some implementations the remote control 114 may comprise a device with independent functionality, such as a smartphone, tablet computer, gaming device, and so forth. The remote control 114 is discussed in more detail below with regard to FIG. 5.

The media controller 108 and one or more of the media devices 106 may be configured to use communication interfaces to couple to one or more networks 118. The network 118 may comprise one or more private networks, public networks such as the Internet, or a combination of both configured to transfer data between two or more devices. The media controller 108 is discussed in more detail below with regard to FIG. 4.

One or more servers 120 or other remote devices are coupled to the network 118. The server 120 may provide various services to the media controller 108, the one or more media devices 106, or combinations thereof. The services may include, but are not limited to providing content for presentation by the user interface 112, storage of content, streaming content, indexing of content, control, programming, and so forth. In some implementations, the server 120 may generate at least a portion of the user interface 112. One or more content providers may operate or utilize the servers 120 to provide a video stream to the media controller 108 or the media device 106 for presentation, such as after the user 102 has selected a piece of content with the user interface 112. The user interface 112 may be configured to present content 104 available from different content providers.

The one or more servers 120(1), 120(2), . . . 120(S) may include a one or more of a content recommendation module 122, the content 104, user experience data 124, user content data 126, content metadata 128, or a content distribution module 130. These modules and their associated functions and data may be executed on a single device, across multiple devices, on the media controller 108, and so forth.

The content recommendation module 122 may be configured to use the user experience data 124 to generate the user content data 126. The user experience data 124 is information descriptive of a user or group of users. For example, the user experience data 124 may indicate preferences as to genre, rating, and so forth for content. The user experience data 124 is described in more detail below with regard to FIG. 2.

In some implementations the content recommendation module 122 may also use the content metadata 128 to generate the user content data 126. The content metadata 128 comprises information about the content 104, such as title, cast, production details, ratings, genre, and so forth. The content metadata 128 may vary over time. For example, the content metadata 128 may include references to sequels, related works, and so forth.

The user content data 126 is information descriptive of the content 104 the user 102 is determined to possibly be interested in, or which is otherwise associated with the user 102. The user interface 112 is configured to present at least a portion of this user content data 126 to the user 102. The user content data 126 is discussed below with regard to FIG. 3. The user interface 112 is configured to present at least a portion of the user content data 126 to the user 102 as described below.

The content distribution module 130 is configured to provide the content 104, or access information to enable presentation of the content 104, to the media controller 108. For example, the content distribution module 130 may be configured to stream the content 104 which the user 102 has selected using the user interface 112 to the media controller 108 for presentation on the media device 106. In another example, the content distribution module 130 may provide data to unlock or enable presentation of content 104 which has been previously stored, at least in part, on the media controller 108. The servers 120 and the various modules are discussed in more detail below with regard to FIG. 6.

One or more social media servers 132 may also be configured to connect to the network 118 and communicate with the one or more of the servers 120. The social media server 132 may be configured to provide social graph data 134 to the servers 120, or provide the servers 120 with access to the social graph data 134. The social media server 132 may be configured to establish and maintain social networks between different users 102, organizations, and so forth. The social graph data 134 may comprise information indicative of at least a portion of these relationships. Additional data may also be provided by the social media servers 132, such as the preferences or ratings of content by other users. The content recommendation module 122 may generate content recommendations for presentation with the user interface 112 based at least in part on the social graph data 134 or other data from the social media server 132

Figure 2:
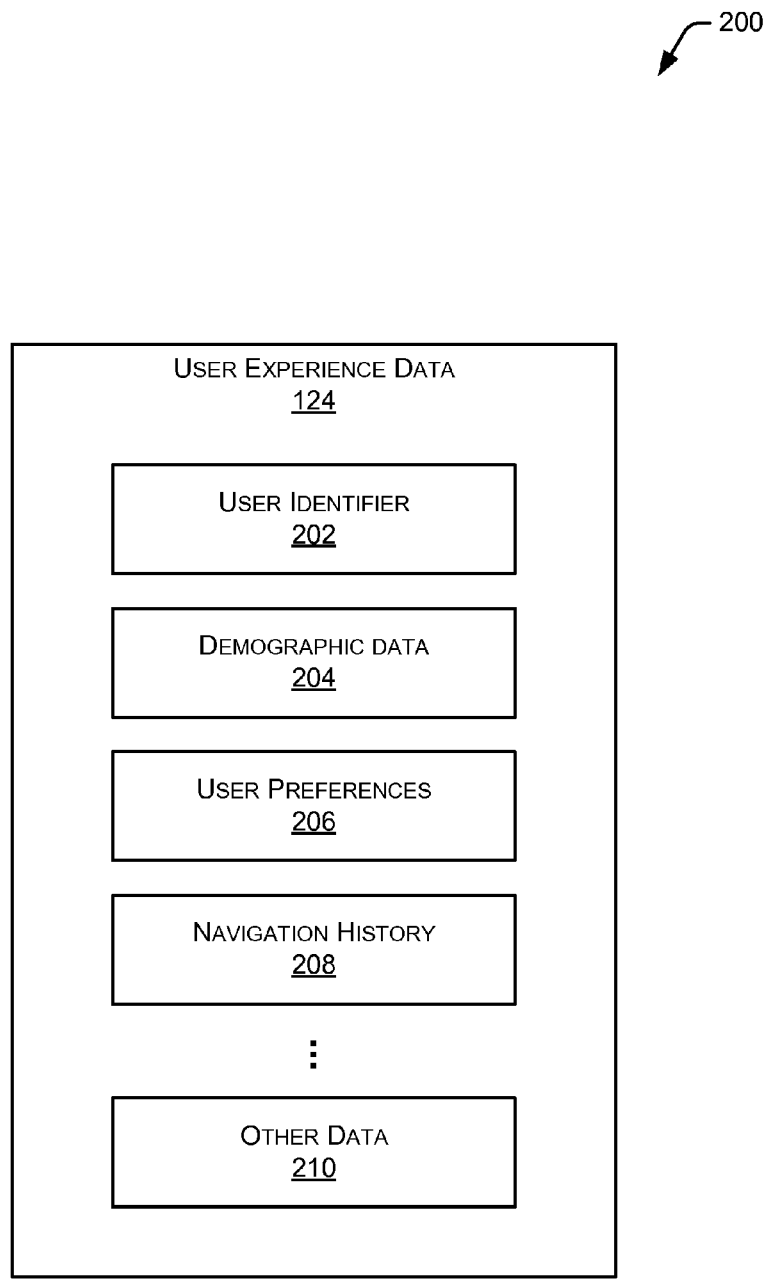
FIG. 2 illustrates a block diagram of user experience data which may be used to select content presented by the user interface.

FIG. 2 illustrates a block diagram 200 of the user experience data 124. The user experience data 126 is information descriptive of the user 102 or group of users 102. A user identifier 202 may be provided to designate one or more users 102. For example, the user experience data 124 associated with a single user 102(1) may include identification data designating that user 102(1). In comparison, the user identifier 202 for a group user profile may contain identification data for several users, such as 102(1), 102(2), . . . , 102(U).

Demographic data 204 may be included in the user experience data 124. The demographic data 204 may include, but is not limited to, age, occupation, place of work, preferred language, and address information. For example, the user interface 112 may be configured to provided recommended content 104 which is in the user's 102 preferred language.

One or more user preferences 206 may also be specified in the user experience data 124. The user preferences 206 may comprise information which is explicitly input by the user 102 or implicit from usage patterns of the user 102. This information may include content genres, categories, presentation formats, ratings, and so forth which the user 102 prefers or avoids. For example, the user 102(2) may use the user interface 112 to explicitly enter the category of "cooking" as a preferred content category for content. In another example, the content recommendation module 122 may implicitly determine the user 102(2) does not prefer content in the "slapstick comedy" genre because the particular user 102(2) has not viewed any content 104 in that genre which has been previously recommended.

The user preferences 206 may also include information about what types or categories of content 104 to provide based at least on the date and time at the media controller 108. For example, the user preferences 206 of the user 102(2) may indicate a preference for news and documentary content 104 from 5:00 a.m. until 5:00 p.m. local time, television episode content 104 between 5:00 p.m. and 7:00 p.m., and movie content 104 from 7:00 p.m. until 12:00 a.m.

Navigation history 208 may also be maintained. The navigation history 208 indicates a path through the user interface 112 which the user 102 has taken. The navigation history 208 may be used to preselect or predetermined certain options, present certain user interface elements, and so forth.

Other data 210 may also be included in the user experience data 124, such as wish list entries of goods or services desired by the user 102, or purchases of goods or services by the user 102. The wish list entries may be processed such that when the user 102 purchases cross-country skiing gear they may be presented in the user interface 112 with content 104 which is associated with cross-country skiing. The content recommendation module 122 may use the user experience data 124 to generate the user content data 126, which is described next.

Figure 3:
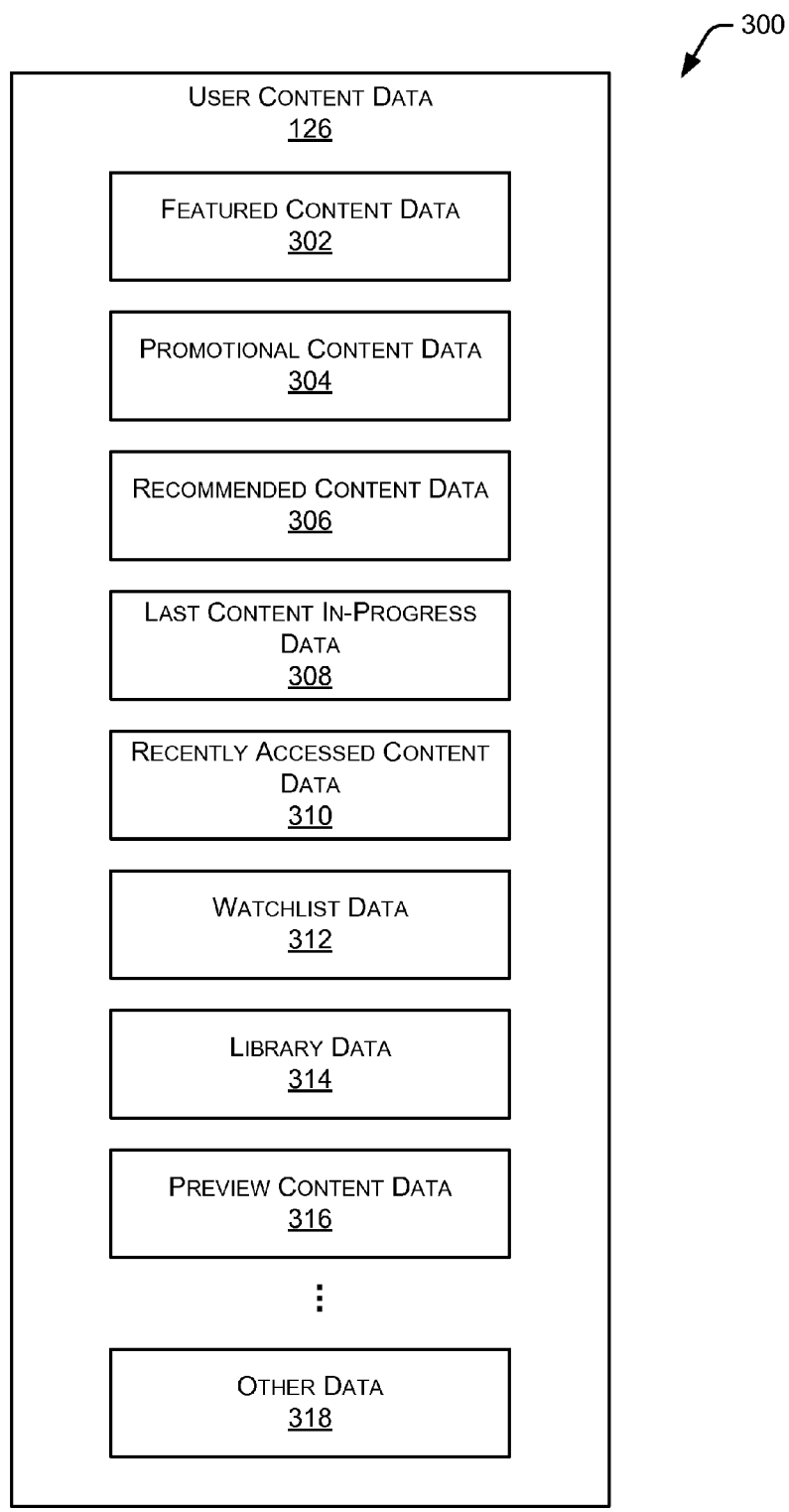
FIG. 3 illustrates a block diagram of user content data which may be used to select content presented by the user interface.

FIG. 3 illustrates a block diagram 300 of the user content data 126. The user content data 126 is information descriptive of what content 104 the user 102 may be interested in, or which is otherwise associated with the user 102 for presentation. The user interface 112 is configured to present at least a portion of this user content data 126 to the user 102. The user content data 126 may designate or include one or more pieces of content 104. The user content data 126 may designate the content 104 by providing a link, reference, pointer, identifier, uniform resource location, and so forth which may be used to access a particular piece of content 104. The user content data 126 may include the content 104, such as when sent to the media controller 108 for presentation.

The user content data 126 may be specific to a particular user 102, or a group of users 102, as designated by the user experience data 124. The following user content data 126 is described as being accessed by the user 102 for ease of discussion, but it is understood that the data may be associated with a group of users 102 as well.

Featured content data 302 designates or includes data about one or more pieces of content 104 for which an emphasis is being placed. This may be content 104 which is of particular relevance to the user 102. For example, the featured content data 302 may include information about newly released movies or television shows which are determined to be of interest to the user 102 by the content recommendation module 122.

Promotional content data 304 designates or includes information about one or more pieces of content 104 which are being advertised. The promotional content data 304 may be descriptive or indicative of a piece of content 104 which is being promoted, such as by a distributor, content provider, merchant, and so forth. For example, the promotional content data 304 may include content 104 for which cost of access has been reduced. The promotional content data 304 may not necessarily be specific to the user 102. For example, the promotional content data 304 may indicate content 104 which is of interest to other users 102 in the same geographic area. The promotional content data 304 thus corresponds to one or more pieces of content 104 which the system 100 is to promote to the user 102.

Recommended content data 306 designates or includes information about one or more pieces of content 104 determined to be of interest to the user 102 identified in the user experience data 124. This determination may be provided by manual input, machine learning, automated heuristics, correlations between different pieces of content 104, and so forth. For example, a user 102 who watches a television show with the genre of "mystery" may receive recommendations for movies which have the same genre.

Last content in-progress data 308 comprises data which indicates a piece of content 104 previously being presented by or for the user 104 but for which presentation has not been completed or terminated. For example, the last content in-progress data 308 may indicate that the user 102 paused or stopped presentation while watching the documentary "Forks Throughout History."

Recently accessed content data 310 designates or includes information about one or more pieces of content 104 which have been previously accessed by the user 102. For example, the recently accessed content data 310 may store content identification information for the previous twenty pieces of content 104 which have been consumed by the user 102. In another example, the recently accessed content data 310 may include content identification information for all content 104 accessed by the user 102 during the previous 72 hours. In some implementations the recently accessed content data 310 may comprise those pieces of content which have been previously accessed by the user 102, excluding the last content-in-progress as indicated by the last content in-progress data 308.

Watchlist data 312 provides a list which designates or includes information about one or more pieces of content 104 which have been indicated by the user 102 as being of particular interest for presentation to the user 102. The user 102 may explicitly add a piece of content 104 to the list using the user interface 112. The watchlist data 312 may include visual, audio, textual, or other forms of content.

Library data 314 designates or includes information about one or more pieces of content 104 for which the user 102 has previously acquired access rights allowing presentation. For example, the library data 314 may be music content 104 which the user 102 has purchased or been given access rights to. In some implementations the library data 314 may designate or include content which is stored locally on the media device 106, the media controller 108, or both.

Preview content data 316 designates or includes information about a portion of one or more pieces of content 104 which are available for preview by the user 102 through the user interface 112. The preview content data 316 may indicate a portion of content 104 to which the user 102 does not currently have complete access rights to. For example, the preview content data 316 may provide the user with two minutes of the content 104.

Other data 318 may also be included in the user content data 126. For example, information about advertisements for goods or services which are associated with the content 104 may be provided.

The content 104 which is designated by the data above may be stored on, or distributed across combinations of the media device 106, the media controller 108, or the server 120. For example, music content 104 may be stored on the media controller 108 while video content 104 is stored on and streamed from the server 120.

Figure 4:
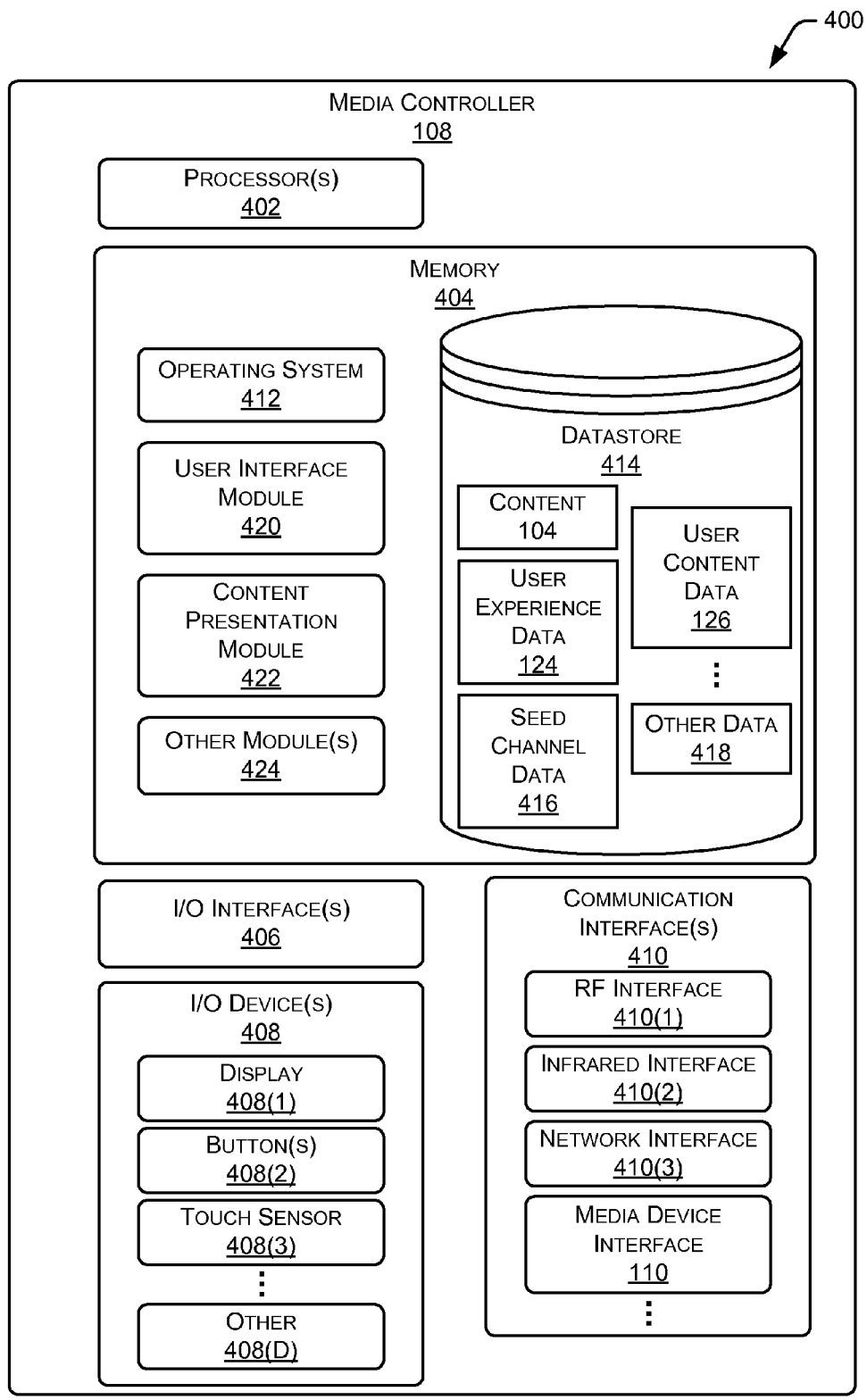
FIG. 4 illustrates a block diagram of a media controller configured to provide the user interface.

FIG. 4 illustrates a block diagram 400 of the media controller 108 configured to provide the user interface 112. The media controller 108 may comprise one or more processors 402, one or more memories 404, one or more input/output ("I/O") interfaces 406, one or more I/O devices 408, and one or more communication interfaces 410.

The processor 402 may comprise one or more cores and is configured to access and execute, at least in part instructions stored in the one or more memories 404. The one or more memories 404 comprise one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The one or more I/O interfaces 406 allow for the coupling I/O devices 408 to the media controller 108. The I/O interfaces 406 may comprise inter-integrated circuit ("I2C"), serial peripheral interface bus ("SPI"), universal serial bus ("USB"), RS-232, RS-432, and so forth. The I/O devices 408 may include one or more displays 408(1), such as liquid crystal or electrophoretic display elements, buttons 408(2) such as in keypads or keyboards, or touch sensors 408(3). The buttons 408(2) may include mechanical buttons, softkeys, keys with integrated displays, and so forth. The touch sensors 408(3) may comprise interpolating force sensing resistor ("IFSR") arrays, capacitive sensors, optical touch sensors, and so forth.

One or more other I/O devices 408(D) such as speakers, microphones, external memory devices, global positioning system receivers, and so forth may also be coupled to the media controller 108 using the I/O interfaces 406.

The one or more communication interfaces 410 provide for the transfer of data between the media controller 108 and other devices such as the remote control 114, the servers 120, and so forth. The communication interfaces 410 may include, but are not limited to, PANs, LANs, WLANs, WWANs, and so forth. As shown here, the communication interfaces 410 may comprise one or more RF interfaces 410(1), one or more infrared interfaces 410(2), one or more network interfaces 410(3), one or more media device interfaces 110, one or more other interfaces, or a combination thereof.

The RF interface 410(1) may comprise a radio transmitter, radio receiver, or radio transceiver. The RF interface 410(1) may be compliant with one or more standard protocols, such as the Bluetooth™ or ZigBee PAN. The infrared interface 410(2) may comprise an infrared transmitter, infrared receiver, or an infrared transceiver. In some implementations the infrared interface 410(2) of the media controller 108 may consist of the infrared receiver and omit the infrared transmitter.

The network interface 410(3) may be configured to connect the media controller 108 wired or wirelessly to one or more networks 118. These networks may include a LAN, WAN, WLAN, WWAN, and so forth. For example, the network interface 410(3) may comprise a transceiver and other devices configured to be compliant with the Institute of Electrical and Electronics Engineers ("IEEE") 802.11 standards. The network interface 410(3) may include a transceiver and other devices configured to be compliant with WWAN networks provided by one or more cellular carriers. For example, the network interface 410(3) may be configured to cellular data networks such as those based on the IEEE 802.16 standards such as WiMax.

The communication interface 410 of the media controller 108 may also comprise the media device interface 110 as described above. For example, several HDMI connections may be supported to allow coupling to one or more of the media devices 106 to present a graphical user interface, audible user interface, and so forth.

The media controller 108 may have various components arranged internally or externally. In one implementation the one or more displays 408(1) may be integrated into a common enclosure of the media controller 108 device. For example, the media controller 108 may have within the enclosure the network interface 410(3), the media device interface 110, the one or more display devices 408(1), the memory 404, and the processor 402. In another implementation, the one or more displays 408(1) may be external to the medial controller 108.

In other implementations other devices or components may be coupled to or incorporated within the media controller 108. For example, digital rights management ("DRM") devices may be provided to control access to content.

The one or more memories 404 may store code or program instructions for execution by the processor 402 to perform certain actions or functions. In some implementations at least a portion of the instructions may be stored in external memory accessible to the media controller 108, such as on the server 120.

These instructions in the one or more memories 404 may include an operating system 412. The operating system 412 is configured to manage hardware resources such as the I/O interfaces 406 and the I/O devices 408. The operating system 412 may provide various services to applications executing on the processor 402.

The one or more memories 404 may also store a datastore 414. The datastore 414 may store one or more of the content 104 or a portion thereof, the user experience data 124, the user content data 126, seed channel data 416, and so forth. The seed channel data 416 is used to generate one or more seed channels for presentation as discussed below. The seed channel data 416 may be based at least in part on the user experience data 124, the user content data 126, or other information. For example, the other information may include information from other users, and so forth.

The datastore 414 may comprise a database, flat file, linked list, or other data structure. Other data 418 may be stored, such as information about the operating system 412 and configuration files.

A user interface module 420 is configured to provide the user interface 112 for presentation to the user 102. For example, the user interface module 420 may generate graphic data such as images of a graphical user interface comprising elements such as menus and prompts for presentation on a display such as the media device 106. In another example, the user interface module 420 may generate audible prompts for presentation using a sound system media device 106. The user interface module 420 is configured to accept input from the user 102. This input may include data received from the remote control 114.

The media controller 108 may also be configured to present content 104. A content presentation module 422 may be stored in the memory 404. The content presentation module 422 is configured to present for consumption at least a portion of content 104 to the users 102 using the I/O interfaces 406, the communication interfaces 410, or both. For example, the content presentation module 422 may be configured to accept a video stream from the server 120 using the network 118 and output the video stream, or a rendering thereof, to the media device 106 for presentation.

In some implementations the content presentation module 422 may be configured to generate the seed channel data 416. The seed channel data 416 is information which associates a variety of different pieces of content 104 for presentation as a seed channel. For example, the seed channel data 416 may indicate user preferences for television shows about cooking and history which may be used to generate the seed channel for presentation which contains shows about television and cooking. The user interface 112 may present provide one or more of the seed channels for selection by the user 102. Upon selection of a seed channel for presentation, the content 104 indicated in the associated seed channel data 416 may be presented. The seed channels are discussed below in more detail with regard to FIGS. 18-20.

In some implementations the media controller 108 may also include a content recommendation module 122. For example, the media controller 108 may be configured to provide at least a portion of the user content data 126 for use in generating the user interface 112. The content recommendation module 122 in the memory 404 may be configured to operate independently, or in conjunction with other devices or modules, such as the content recommendation module 122 of the server 120.

Other modules 424 may also be stored in the memory 404. For example, a user authentication module may be configured to authenticate the user 102.

Figure 5:
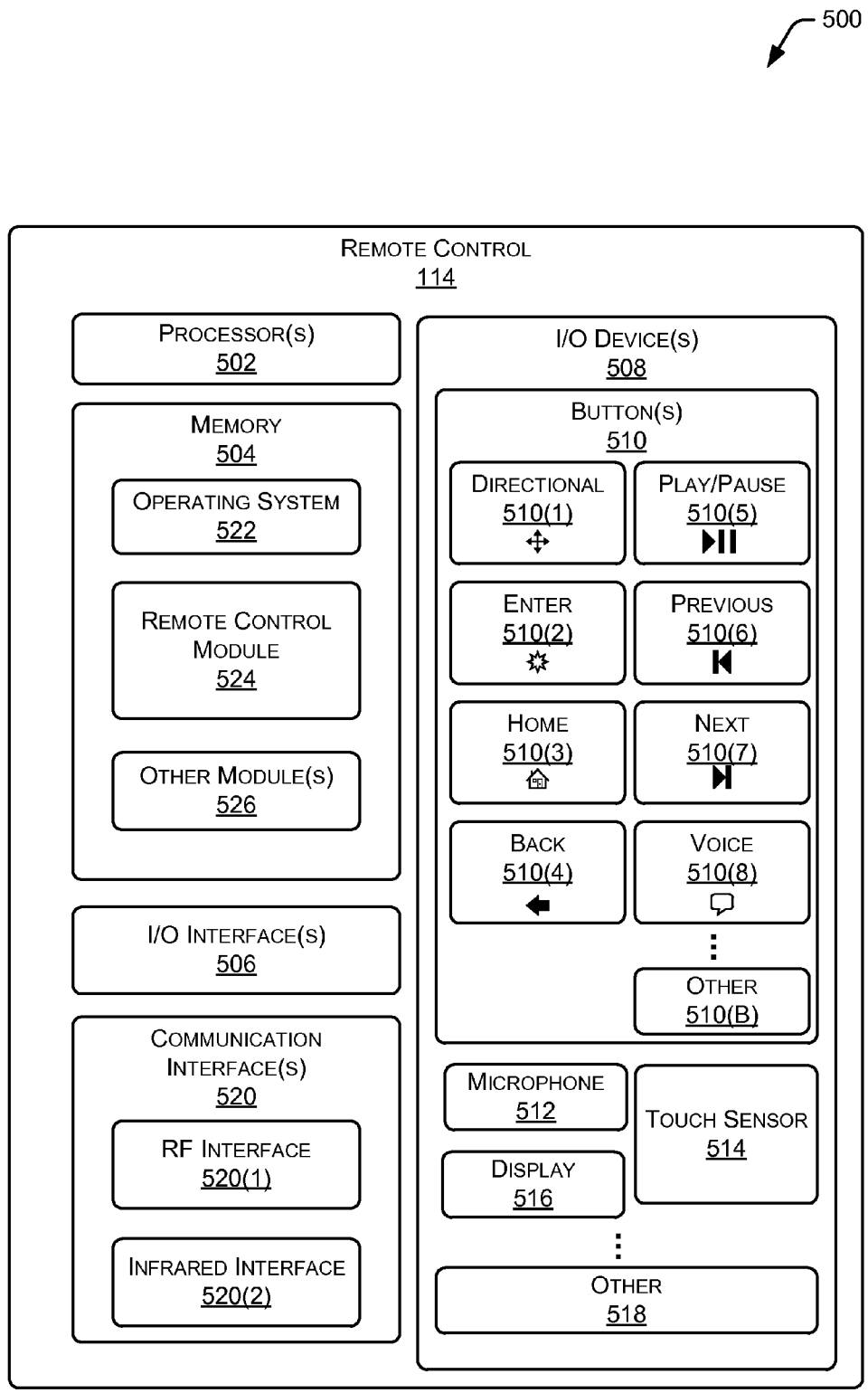
FIG. 5 illustrates a block diagram of a remote control configured to facilitate user interaction with the user interface.

FIG. 5 illustrates a block diagram 500 of the remote control 114 configured to facilitate user interaction with the user interface 112. As described above, the remote control 114 is a portable device and is configured to provide user input to the media controller 108. The remote control 114 may be a device with independent functionality, such as a smartphone, tablet computer, gaming device, and so forth, which is in communication with the media controller 108. In some implementations, the remote control 114 may also be configured to produce output such as visual, audible, haptic, and so forth. Using this output capability the user interface 112, or at least a portion of the user interface 112, may be presented using the remote control 114.

Similar to the media controller 108 described above, the remote control 114 may comprise one or more processors 502, one or more memories 504, one or more I/O interfaces 506, and one or more I/O devices 508. The I/O devices 508 may include one or more buttons 510, touch sensors microphones 512, touch sensors 514, displays 516, and other I/O devices 518. The other I/O devices 518 may include, accelerometers, gyroscopes, light sensors, haptic output devices configured to provide a vibrotactile output, speakers, digital light projectors, and so forth.

The buttons 510 may be hard keys or soft keys. The buttons may include one or more directional buttons 510(1). The directional buttons 510(1) may allow the user 102 to move among elements in the user interface 112, for example up, down, left, right, diagonally, and so forth. An enter button 510(2) may be provided to accept user 102 input indicating selection or acceptance of an element in the user interface 112. A home button 510(3) may be provided, which when activated, initiates presentation of a home menu. A back button 510(4) may be configured to transition the user interface 112 back to a previous condition, menu level, and so forth.

A play/pause button 510(5) may allow for the initiation and suspension of presentation of content by the media controller 108. In some implementations the play/pause button 510(5) may also allow for the input of a stop to presentation. For example, a momentary press of the button 510(5) having a duration of less than 500 milliseconds (ms) may result in a toggle between a play and a pause state. A longer press of the button 510(5) which lasts for 500 ms or more may result in initiating a stop of the content 104 presentation.

A previous button 510(6) provides may allow for functions such as rewinding the presentation of the content 104, jumping to an earlier point in the content 104, and so forth. Similarly, a next button 510(7) may be configured to move forward in the content 104 during presentation, jump to a later point in the content 104, and so forth.

A voice button 510(8) activates the system 100 to accept verbal input. For example, pressing the voice button 510(8) may initiate acquisition of data from the microphone 512 and sending the data to the media controller 108.

Other buttons 510(B) may be provided, such as a power button, volume buttons, and so forth.

The remote control 114 also includes one or more communication interfaces 520. The communications interfaces 520 may include an RF interface 520(1) and an infrared interface 520(2). These interfaces may be similar to, or communicatively compatible with, the RF interface 410(1) and the infrared interface 410(2) described above with regard to FIG. 4.

The memory 504 may store one or more of an operating system module 522, a remote control module 524, or other modules 526. The operating system module 522 may be similar to that described above with regard to 412. The remote control module 524 is configured to manage inputs and outputs from the I/O devices 108 of the remote control 114 and exchanges data associated with the inputs and output with the media controller 108. The other modules 526 in the memory 504 may include an RF to infrared repeater module, speech recognition module, audio encoder module, and so forth.

Figure 6:
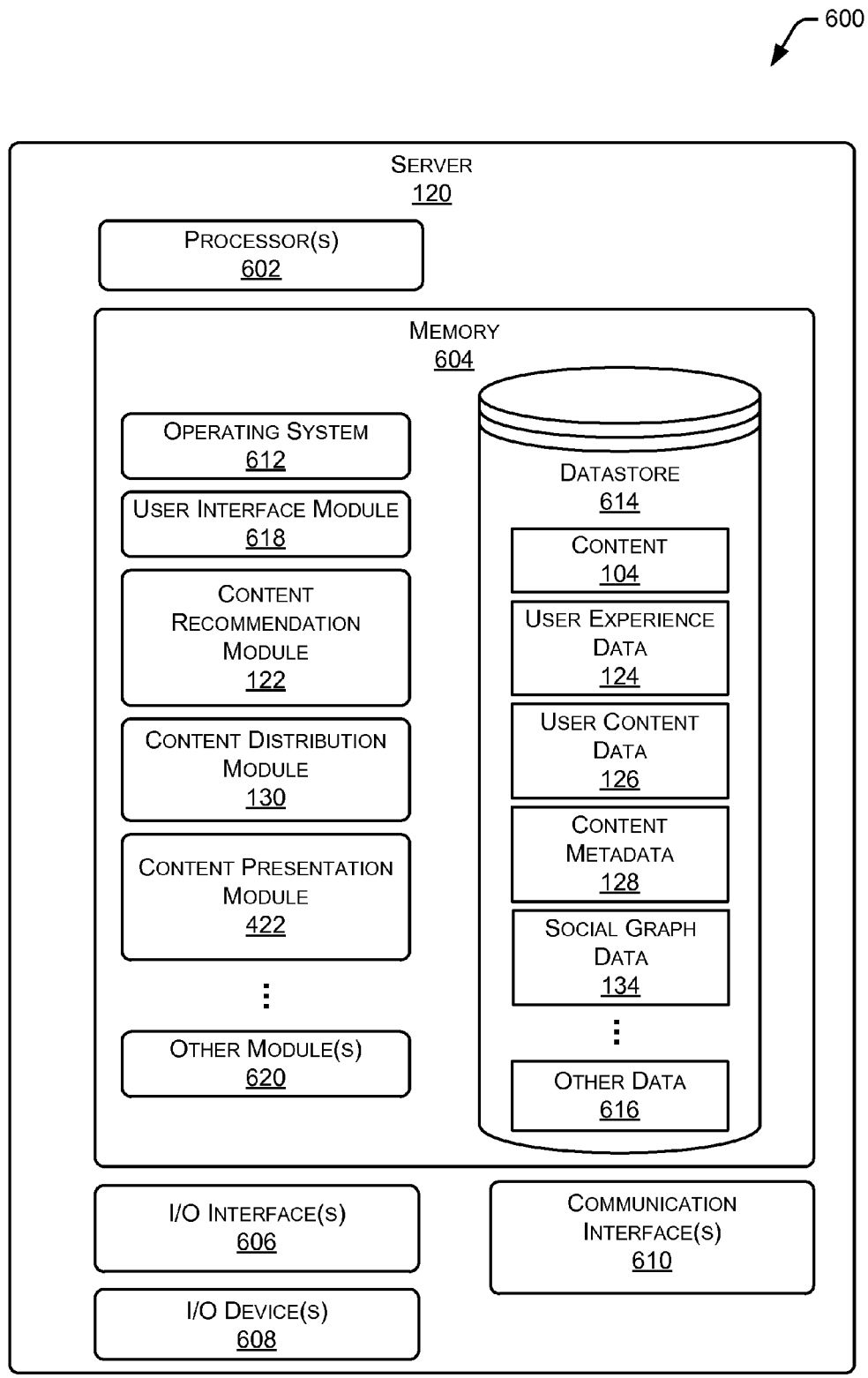
FIG. 6 illustrates a block diagram of a server configured to provide user content data, content, or both to the media controller.

FIG. 6 illustrates a block diagram 600 of the server(s) 120 configured to provide one or more of the content 104, the user experience data 124, the user content data 126 to the media controller 108.

The server 120 may comprise one or more processors 602, one or more memories 604, one or more input/output ("I/O") interfaces 606, one or more I/O devices 608, and one or more communication interfaces 610.

Similar to above, the processor 602 may comprise one or more cores and is configured to access and execute, at least in part instructions stored in the one or more memories 604. The one or more I/O interfaces 606 allow for the coupling I/O devices 608 to the server 120. The I/O interfaces 606 may comprise I2C, SPI, USB, RS-232, RS-432, and so forth. The I/O devices 608 may include keyboards, touch sensors, external storage devices, and so forth.

The one or more communication interfaces 610 provide for the transfer of data between the server 120 and other devices such as the media controller 108, other servers 120, and so forth. The communication interfaces 610 may include, but are not limited to, PANs, LANs, WLANs, WWANs, and so forth.

In other implementations other devices or components may be coupled to or incorporated within the server 120. For example, cryptographic processors and digital rights management ("DRM") devices may be provided to control access to content.

The one or more memories 604 may store code or program instructions for execution by the processor 602 to perform certain actions or functions. In some implementations at least a portion of the instructions may be stored in external memory accessible to the server 120, such as on the media controller 108.

These instructions in the one or more memories 604 may include an operating system 612. The operating system 612 is configured to manage hardware resources such as the I/O interfaces 606 and the I/O devices 608. The operating system 612 may provide various services to applications executing on the processor 602.

The one or more memories 604 may also store a datastore 614. The datastore 614 may store one or more of the content 104 or a portion thereof, the user experience data 124, the user content data 126, the social graph data 134, and so forth. In some implementations the datastore 614 may also store the seed channel data 416. The datastore 614 may comprise a database, flat file, linked list, or other data structure. Other data 616 may be stored, such as information about the operating system 612 and configuration files.

A user interface module 618 may be stored in the memory 604 and configured to provide a user interface allowing for configuration and operation of the server 120. The user interface module 618 may also be configured to generate at least a portion of the user interface 112 and the at least a portion to the media controller 108.

The content recommendation module 122 may also be stored in the memory 604. As described above, the content recommendation module 122 is configured to generate the user content data 126 based at least in part on the user experience data 124. The content recommendation module 122 may be configured to determine content 104 which is recommend for a particular user 102, based at least in part on the user experience data 124 and the user content data 126. This determination may be provided by manual input, machine learning, automated heuristics, correlations between different pieces of content 104 and the user experience data 124, and so forth.

The memory 604 may also store the content distribution module 130. As also described above, the content distribution module 130 is configured to provide the content 104, portions thereof, or access information to enable presentation of the content 104 to the media controller 108. The content distribution module 130 may be configured to access the content 104 stored in the datastore 614 and generate a stream for transmission to the media controller 108.

The server 120 may also include the content presentation module 422 in the memory 604. As described above, the content presentation module 422 may be configured to generate the seed channel data 416 and otherwise support the presentation of seed channels on the media controller 108. The seed channels are discussed below in more detail with regard to FIGS. 18-20.

Other modules 620 may also be stored in the memory 604. For example, a billing and administrative module may be configured to provide for assessing charges for access to the content 104.

Illustrative User Interfaces

Figure 7:
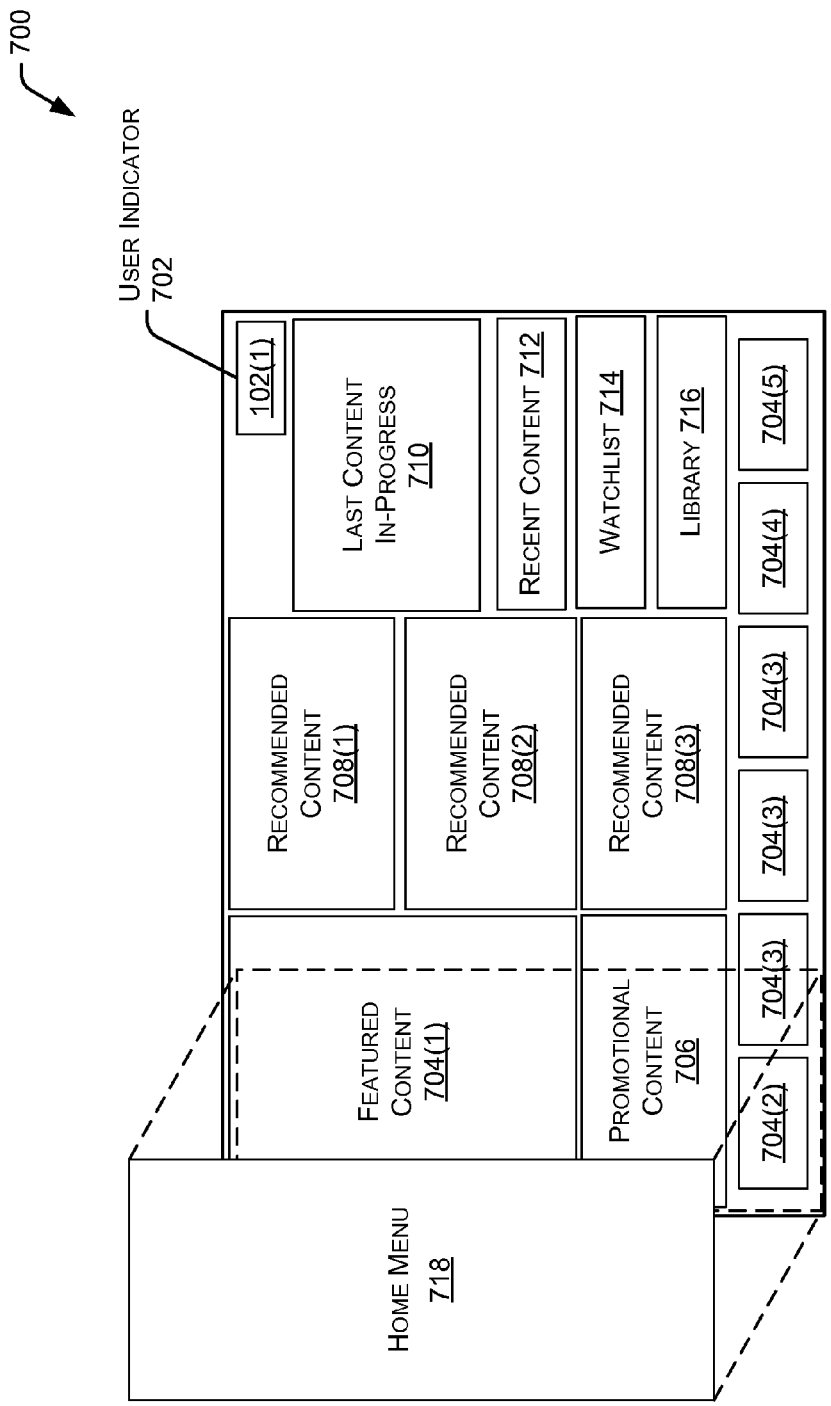
FIG. 7 illustrates a primary user interface.

FIG. 7 illustrates a primary user interface 700 of the media controller 108 configured to present elements which are representative of at least a portion of one or more pieces of the content 104 for the user 102 to consume. These pieces of content 104 may be provided or otherwise be made available by different content providers. The primary user interface 700 may be part of the overall user interface 112 provided at least in part by one or more of the media device 106, the remote control 114, the media controller 108, or the server 120, which is configured to allow the user 102 to select and consume content from different content providers.

The primary user interface 700 may include a user indicator 702. The user indicator 702 provides an indication as to the particular user 102 which is associated with a particular session of interaction with the user interface 112. The user 102 associated with the particular usage session is the one for which the user content data 126 is generated which includes the data described above with regard to FIG. 3 about various suggested or recommended pieces of content 104. For example, in this implementation as depicted by the user indicator 702, user 102(1) is the currently associated user, so the content 104 presented will be tailored for the user 102(1). As depicted below with regard to FIG. 16, changing the user 102 may result in different recommendations being presented in the user interface 112, including at the primary user interface 700. Where the user 102 is a group, the content 104 presented will be tailored for that group.

Featured content 704 may be presented. The featured content 704 provides a representation or indication of one or more pieces of content 104 and is based at least in part on the featured content data 302 described above. For example, the featured content 704 may present information about content 104 which is newly released. This information may include thumbnails of promotional graphics, text, icons, and so forth.

In the implementation depicted here, featured content 704(1) may be presented as an element in the upper leftmost corner of the primary user interface 700. Additional featured content 704(2)-(5) may be presented along the bottom of the primary user interface.

The primary user interface 700 may also include promotional content 706. The promotional content 706 provides a representation or indication of one or more pieces of content 104 and is based at least in part on the promotional content data 304 described above. For example, the promotional content 706 may present advertisement information for a television series. This information may include thumbnails of promotional graphics, text, icons, and so forth. In the implementation depicted here, promotional content 706 may be presented as an element below the featured content 704(1) and above the featured content 704(2)-(5).

Recommended content 708 may be presented in the primary user interface 700. The recommended content 708 provides a representation or indication of one or more pieces of content 104 and is based at least in part on the recommended content data 306 described above. For example, the recommended content 708 may present information about content 104 with the genre of "mystery" when the user 102 has expressed an interest in this genre. As above, this information may include thumbnails of promotional graphics, text, icons, and so forth. In the implementation depicted here, the recommended content 708 may be presented as three elements 708(1)-(3) arranged above the featured content 704(2)-(5) and to the right of the featured content 704(1).

As described above, the content 104 presented in the primary user interface 700 may be based at least in part on the user 102 currently associated with the user interface 112. Based at least in part on the user experience data 124 for the associated user, the content 104 presented may vary. For example, in the implementation where the user 102(1) is a group such as the family of users Arthur 102(2), Bea 102(3), and Charles 102(4), the recommended content 708 may contain recommendations which are specific to individuals in the group. Continuing the example, the recommended content 708(1) may be tailored for the user Arthur 102(2), while the recommended content 708(2) is tailored for the user Bea 702(3), and the recommended content 708(3) is tailored for the user Charles 103(4).

In some implementations one or more of the recommended content 708 presented may be based on the user experience data 124 for the group user 102(1) and the associated user content data 126(1). For example, the recommended content 708(3) may provide content 104 for the family user 102(1), such as "family movie night" suggestions.

Last content in-progress 710 may be presented. The last content in-progress 710 provides a representation or indication of one or more pieces of content 104 and is based at least in part on the last content in-progress data 308 described above. For example, the last content in-progress 710 may present information about content 104 which the user 102 paused or stopped before presentation was complete. This information may include thumbnails of promotional graphics, image from the point at which presentation was paused or stopped, text, icons, and so forth. In the implementation depicted here, the last content in-progress 710 may be presented as an element arranged to the right of the recommended content 708 in the upper right corner of the primary user interface 700 and above the featured content 704(2)-(5).

Recent content 712 may be presented. The recent content 712 provides a representation or indication of one or more pieces of content 104 and is based at least in part on the recently accessed content data 310 described above. For example, the recent content 712 may present an indication of the number of pieces of content 104 consumed in the last day. This information may include a count of content, thumbnails of promotional graphics, text, icons, and so forth. In the implementation depicted here, the recent content 712 may be presented as an element arranged to the right of the recommended content 708, below the last content in-progress 710, and above the featured content 704(2)-(5).

A watchlist 714 may be presented. The watchlist 714 provides a representation or indication of one or more pieces of content 104 and is based at least in part on the watchlist data 312 described above. For example, the watchlist 714 may present an indication of the number of pieces of content 104 which have been selected by the user 102 for later consumption. This information may include a count of content, thumbnails of promotional graphics, text, icons, and so forth. In the implementation depicted here, the watchlist 714 may be presented as an element arranged to the right of the recommended content 708, below the recent content 712, and above the featured content 704(2)-(5).

A library 716 may be presented. The library 716 provides a representation or indication of one or more pieces of content 104 and is based at least in part on the library data 314 described above. For example, the library 716 may present an indication of the number of pieces of content 104 which the user has previously acquired access rights to. This information may include a count of content, thumbnails of promotional graphics, text, icons, and so forth. In the implementation depicted here, the library 716 may be presented as an element arranged to the right of the recommended content 708, below the watchlist 714, and above the featured content 704(2)-(5).

As described above, the content 104 represented by the various elements described above may be available from a plurality of content providers. For example, the featured content 704 may include content from content provider A, content provider B, and content provider C. This allows the user 102 to use the user interface 112 to access content 104, regardless of the content provider.

A home menu 718 may also be presented in the primary user interface 700 or in other portions of the user interface 112. In some implementations, the home menu 718 may be invoked by the user 102 activating the home button 510(3) on the remote control 114 or by using the voice button 510(8) to provide verbal input, such as saying the word "home". In some implementations, when invoked the home menu 718 element may be adjacent to the left edge of the screen.

The home menu 718 may be configured to present elements which may be frequently accessed by the user 102. In one implementation the home menu 718 may comprise elements for selecting or calling different portions of the overall user interface 112. These portions of the user interface 112 may include "movies and television," "music," "photos," "games," "apps," "account information and selection," "children's mode," or "settings." For example, the user 102 may select the "account" option to present a user interface configured to allow selection of a different user, such as described below with regard to FIG. 15.

The user 102 may navigate among the various elements in the primary user interface 700 using the remote control 114 or other input devices. For example, the user 102 may activate the directional button(s) 510(1) to select the featured content 704(3), the recent content 712, and so forth. The selection in the user 102 interface may be explicit or implicit. Explicit selection involves the user 102 providing a user input, such as pressing the enter button 510(2) on the remote control 114. Implicit selection involves the user 102 taking no action on a particular element which is in focus for a pre-determined period of time. For example, the user 102 may use the directional button(s) 510(1) to highlight the watchlist 714. The focus of the primary user interface 700 is now the watchlist 714. Should the user 102 take no action after a pre-determined period of time, such as 500 milliseconds (ms), a user interface associated with the watchlist 714 may be presented.

Figure 8:
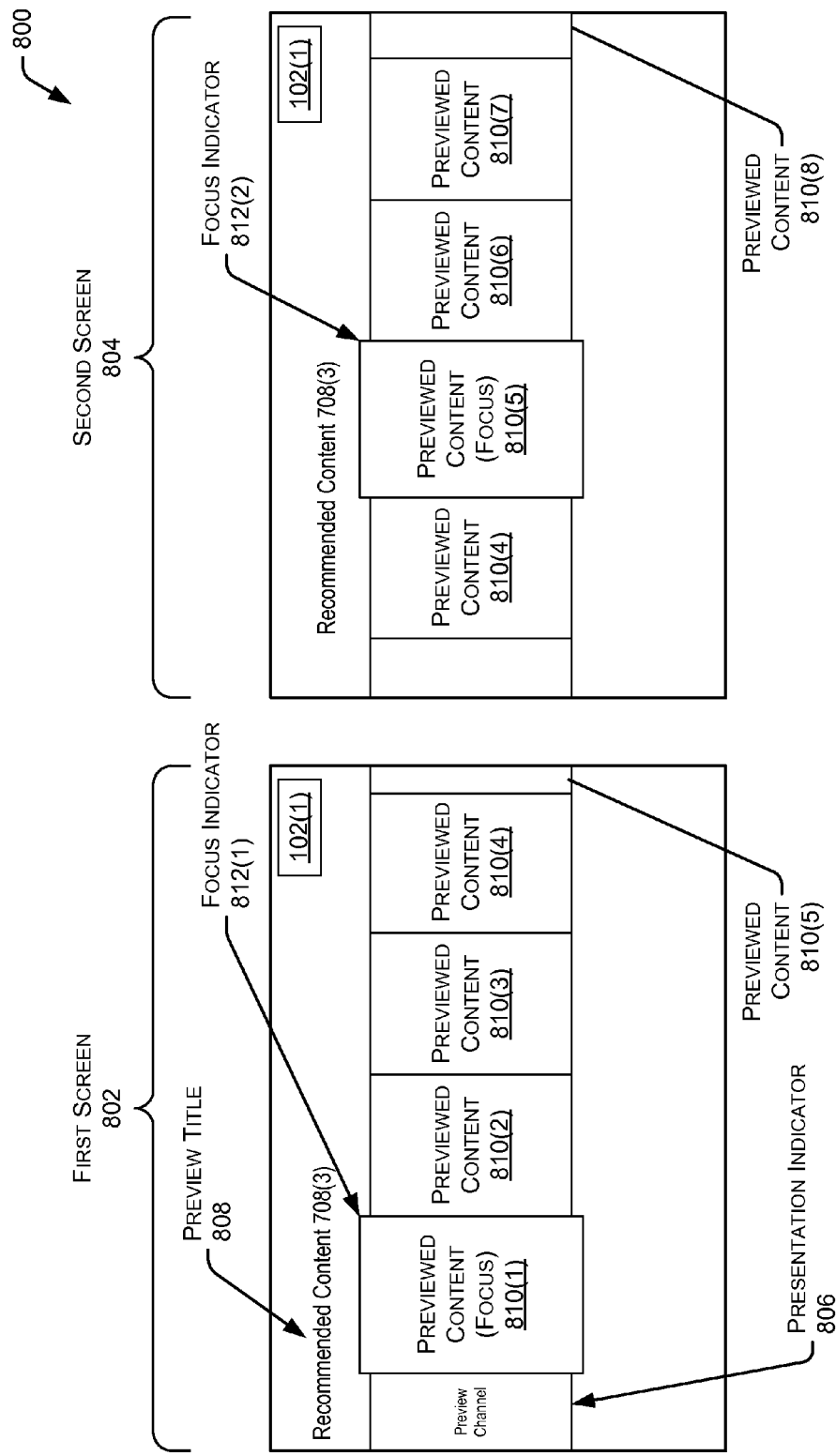
FIG. 8 illustrates a content preview user interface configured to provide previews or samples of content.

FIG. 8 illustrates several views of a content preview user interface 800 configured to provide previews or samples of at least a portion of the content 104 indicated in the user content data 126. The content preview user interface 800 provides the user 102 with an opportunity to interact with at least a portion of the recommended content 708. For example, the user 102 may have selected the recommended content 708(3) of FIG. 7, which would result in the display of the content preview user interface 800.

In this illustration a first screen 802 and a second screen 804 are shown. In the first screen, a presentation indicator 806 is provided. The presentation indicator 806 provides a cue to the user 102 as to what the content preview user interface 800 is showing. In this illustration, the presentation indicator 806 is the text "preview channel." A preview title 808 may also be presented. For example, where the recommended content 708(3) is for the family user 102(1) the preview title 808 may read "Family Movie Night."

One or more pieces of previewed content 810 may be depicted in the content preview user interface 800. In this illustration, the first screen 802 depicts previewed content 810(1)-(4) and a portion of 810(5) arranged along a horizontal midline of the screen. The previewed content 810 which is in focus may be indicated with a focus indicator 812. The focus indicator 812 may include a visual, audible, or haptic effect configured to be perceptible to the user 102. As shown here, the focus indicator 812 may be a representation of the element in focus which is enlarged relative to the other non-focused elements.

The user 102 may use the directional button(s) 510(1) or other inputs to navigate through the previewed content 810. In this illustration the user 102 may provide navigational input to the right in the presentation of the previewed content 810. As the user 102 provides this input, the user interface 800 may be updated to change the element in focus. As shown in the second screen 804, the focus indicator 812(2) is now indicating the previewed content 810(5) is in focus. Also, in the second screen 804, due to the user input, a portion of the previewed content 810(3) is presented, as well as the previewed content 810(4)-810(7) and a portion of 810(8).

Figure 9:
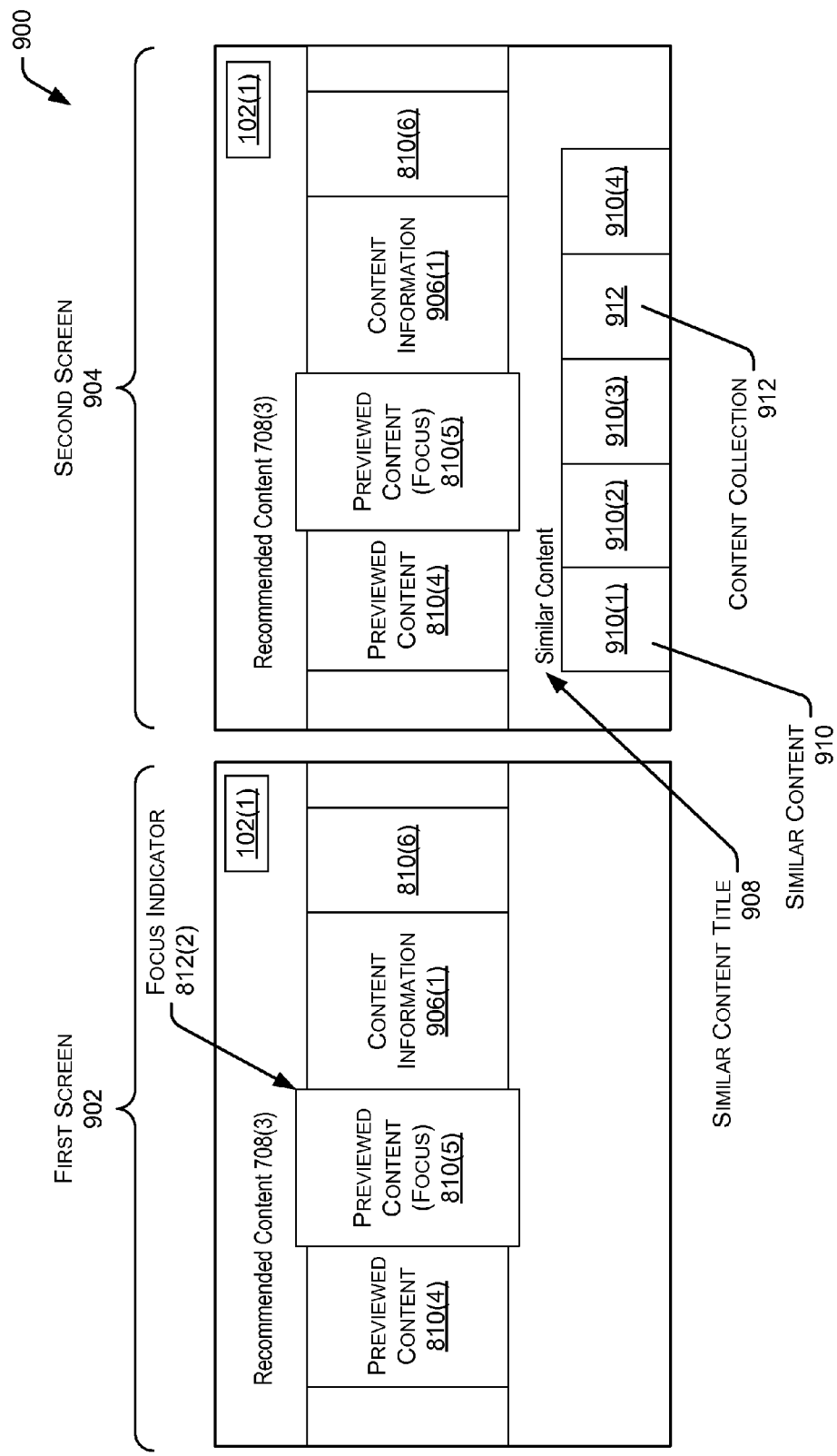
FIG. 9 illustrates the content preview user interface of the media controller configured to provide content information and present similar content.

FIG. 9 illustrates the content preview user interface 900 of the media controller configured 108 to provide content information such as details and present content 104 which is related or similar to the recommended content. The content may be related by one or more attributes. The attributes may include subject, title, author, cast, crew, series, genre, rating, and so forth. In this illustration a first screen 902 and a second screen 904 of the user interface 900 are depicted.

The first screen 902 illustrates a user interface similar to that presented by the second screen 804 of FIG. 8. However, in this illustration content information 906 is presented for the previewed content 810 which is in focus. The content information 906 may include ratings, display format such, year released, ratings, and so forth.

In this illustration content information 906(1) is shown for the previewed content 810(5). The content information 906 may manifest as a "slide out" or an element extending from the previewed content 810 which is in focus.

The presentation of the content information 906 may be selected in the implicit or explicit fashion described above. For example, the user 102 may press the enter button 510(2) on the remote control 114 or may pause while the focus is on the previewed content 810(5) for a pre-determined amount of time to present the content information 906.

The second screen 904 depicts the presentation of a similar content title 908 and similar content 910. The similar content 910 is content 104 which is associated or correlated with the previewed content 810 which is in focus, or for which the content information 906 are currently being presented. In this illustration the similar content 910(1)-(4) is depicted. The similar content 910 and other content presentation elements described in this disclosure may include one or more content collections 912.

The content collection 912 provides for presentation of an aggregated group of a plurality of pieces of content 104. For example, a content collection 912 may indicate several pieces of content 104 which have the same lead actor. In another example, the content collection 912 may present several pieces of content 104 with the same theme. The content collection 912 thus provides for a condensed view of many pieces of content 104. The content collection 912 element may be configured to expand and show at least a portion of the plurality of pieces of content 104 upon focus or selection.

Figure 10:
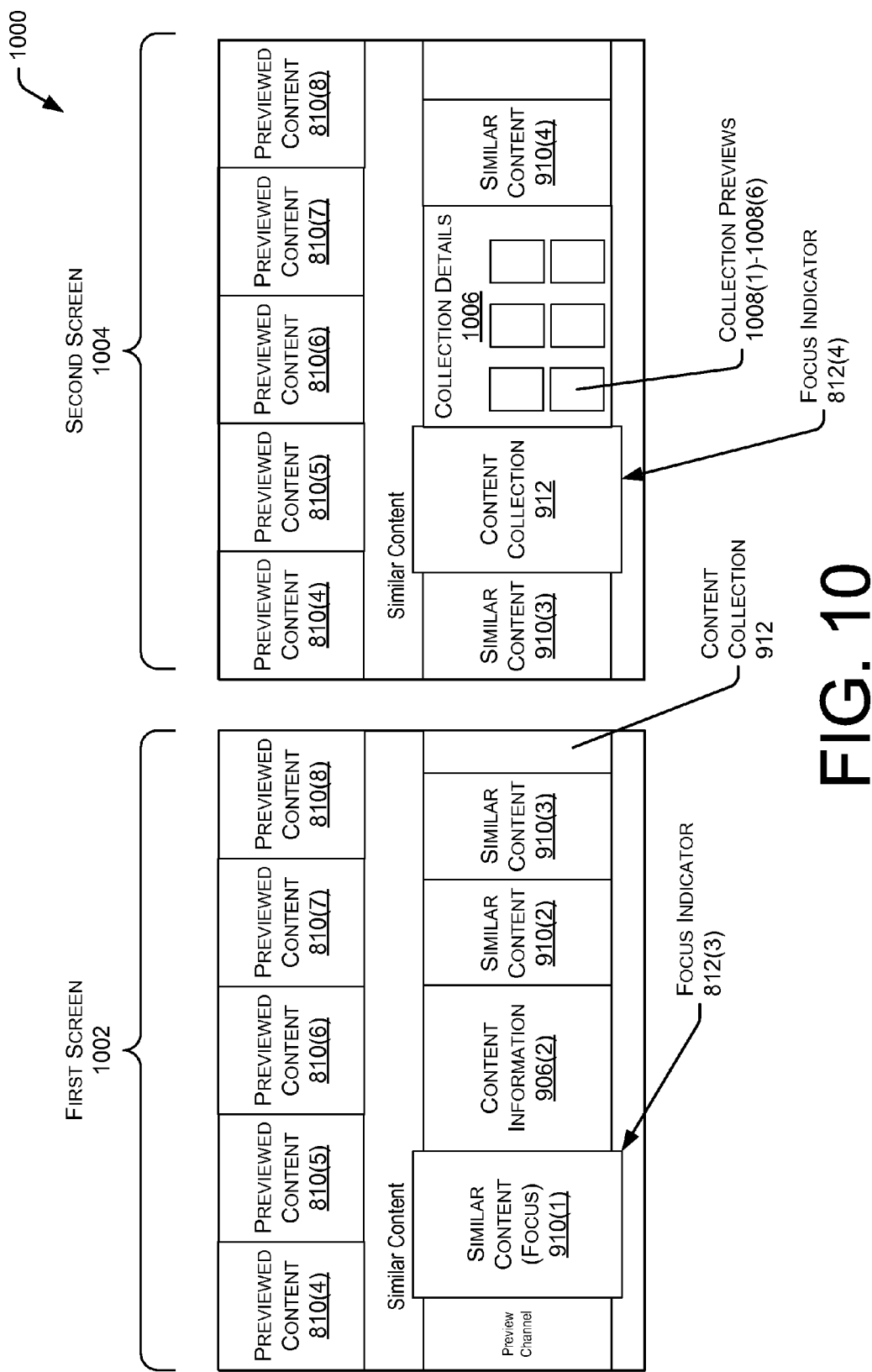
FIG. 10 illustrates the presentation of a user interface presenting similar content and content collections.

FIG. 10 illustrates the presentation of a user interface 1000 presenting similar content 910 and content collections 912. In one implementation, the user 102 may navigate to this user interface 1000 by using a down input on the directional button 510(1) from the screen 904. This may result in a transition from the user interface 900 to the user interface 1000. The user interface 1000 may also be accessed in other ways, such as a selection from the home menu 718. Show here are a first screen 1002 and a second screen 1004 of the user interface 1000.

One or more pieces of similar content 910 may be depicted in the user interface 1000. In this illustration, the first screen 1002 depicts similar content 910(1)-910(3) elements as well as a content detail 906(2) element associated with the similar content 910(1). These elements may be arranged horizontally across the screen. The similar content 910(1) which is in focus may be indicated with a focus indicator 812(3).

The user 102 may use the directional button(s) 510(1) or other inputs to navigate the similar content 910. For example, in this illustration, the user 102 may provide input moving to the right in the presentation of the similar content 910. As the user 102 provides this input, the user interface 1000 may be updated to change the element in focus.

As shown in the second screen 1004, a focus indicator 812(4) indicates the content collection 912 is now in focus. Also, in the second screen 1004, due to the user input, collection details 1006 are presented for the content collection 912. These collection details 1006 may include one or more collection previews 1008. The collection previews 1008 may include graphics, text, icons, and so forth. As depicted here, the representation of the collection previews 1008 may be displayed in a gridded arrangement of images associated with the related pieces of content. In other implementations the collection previews 1008 may be arranged in different ways such as along an arc, circle, polygon, irregular shape, and so forth. In some implementations the collection previews 1008 may overlap one another, or be at least partially obscured by other elements in the user interface.

The user 102 may navigate through the collection previews 1008 and select a particular piece of content 104 indicated therein. In some implementations, when the focus transitions to the collection details 1006, the user interface 1000 may transition to a display the same or similar to that shown in FIG. 8, with indicators representative of the content 104 comprising the content collection 912 being previewed.

Figure 11:
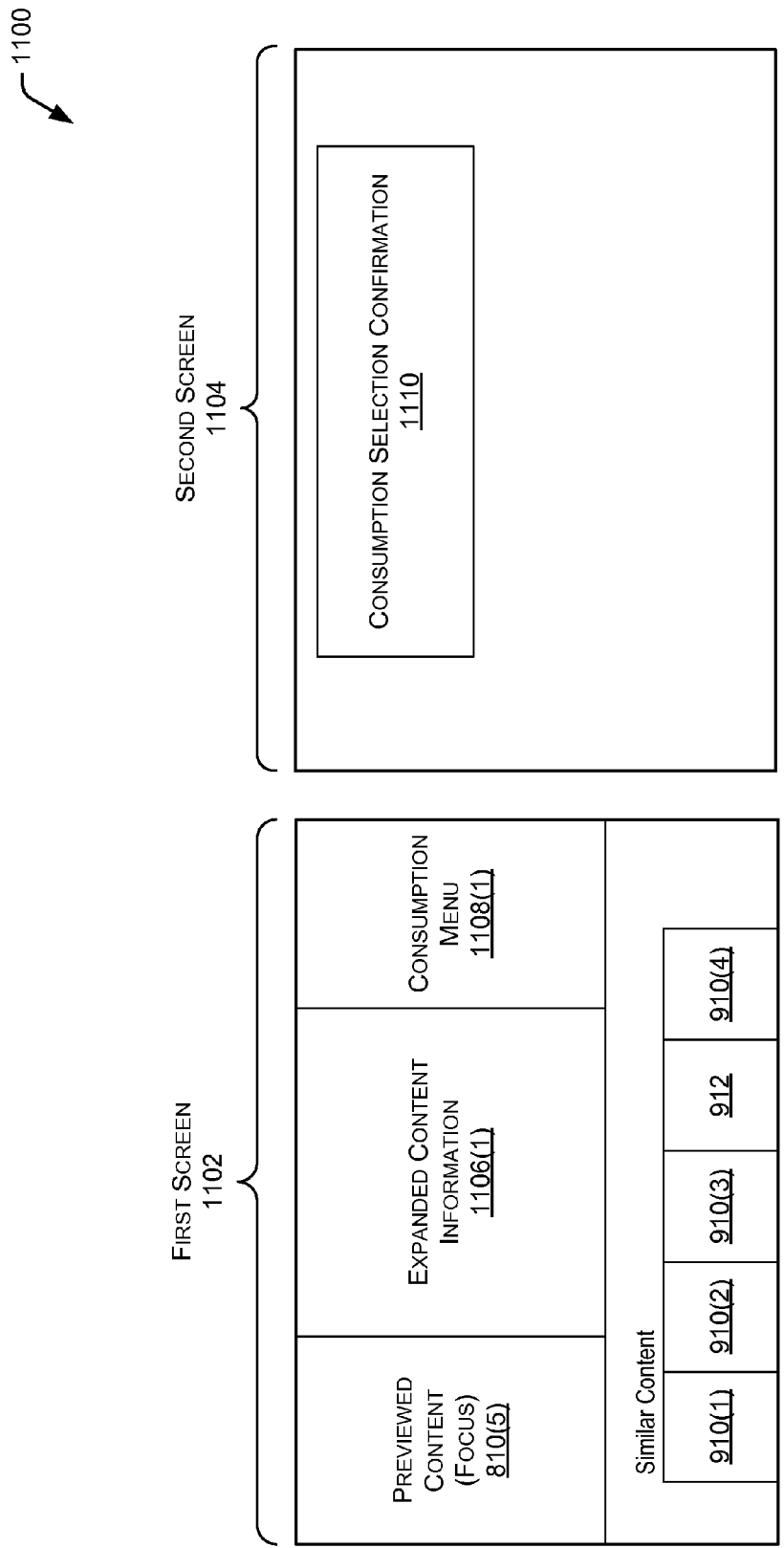
FIG. 11 illustrates an expanded content detail user interface configured to provide additional content information and a consumption menu.

FIG. 11 illustrates an expanded content detail user interface 1100. In this illustration two screens are depicted: a first screen 1102, and a second screen 1104. The first screen 1102 depicts the user interface with additional content information and a consumption menu presented to the user 102. In one implementation, the user interface 1102 may be presented to the user 102 after pressing the enter button 510(2) on the previewed content 810(5) as presented in the second screen 904 of the user interface 900 of FIG. 9.

In this user interface 1102, an element to the left of the screen depicts the previewed content 810 which was in focus at the time of the user's selection, such as by pressing the enter button 510(2). In this illustration, the previewed content 810(5) was in focus at the time of selection. Expanded content information 1106 about the previewed content 810(5) is provided in a central element on the screen. The expanded content information 1106 may include one or more of the genre of the content, categories the content is associated with, presentation formats, ratings, release date, cast listing, production notes, length, additional information or links to additional information about the cast, a description of the content, and so forth. In this illustration, expanded content information 1106(1) provide extra information to the user 102(1) about the previewed content 810(5).

In the implementation depicted, to the right of the expanded content information 1106 a consumption menu 1108 is presented. The consumption menu 1108 provides consumption elements associated with consumption. The consumption elements may include controls for watching a trailer, renting, buying, adding to a watchlist, reading or entering reviews, seeing additional information, and so forth.

The elements associated with acquiring access rights, such as renting or buying may lead to presentation of additional information, such as when several content providers are available to provide the content 104 which is being previewed. For example, the user 102 may have accounts with three content providers X, Y and Z. The previewed content 810 may be available from all three content providers, and options for presentation from each may be shown. For example, the user 102 may be presented with options as part of the consumption menu 1108 or a subordinate user interface to select for viewing the previewed content 810(5) at a lower resolution as part of an existing package with provider X, rent from Y at a higher resolution, or purchase from Z.

In some implementations particular purchase or rental options may be determined and presented in the consumption menu 1108. These options may be determined and presented based at least in part on the user experience data 124, the user content data 126, or both. For example, based on the user preferences and existence of account information for provider X and not provider Y, the consumption menu 1108 may to the user the option to view the content from provider X, and omit presentation of options to rent the content from provider Y.

As depicted above, the similar content 910(1)-(4) and the content collection 912 may also be presented. This allows the user 102 easy navigation to other comment. Should the user 102 decide the previewed content 810 is not of interest at this the user 102 may easily transition to the similar content 910, the content collection 912, and so forth.

As described above, the user interface 112 may be configured to provide content and information from a variety of different content providers. As a result, the overall user experience provided by the user interface 112 is one of seamless access to, and information about, content 104, regardless of the source.

The second screen 1104 presents a consumption selection confirmation 1110 element. In some implementations the consumption selection confirmation element 1110 may be overlaid on the first screen 1102, a content preview display which has been expanded to fill the screen, and so forth.

The consumption selection confirmation 1110 may provide the user 102 with information about the details of consumption, such as format, resolution, conditions of rental or purchase, fees, and so forth. The consumption selection confirmation 1110 element may also include elements such as controls to approve the rental or purchase, cancel the transaction, and so forth. Upon approval or confirmation, the action requiring the confirmation may proceed. For example, the content 104 may be rented and presentation may begin.

Figure 12:
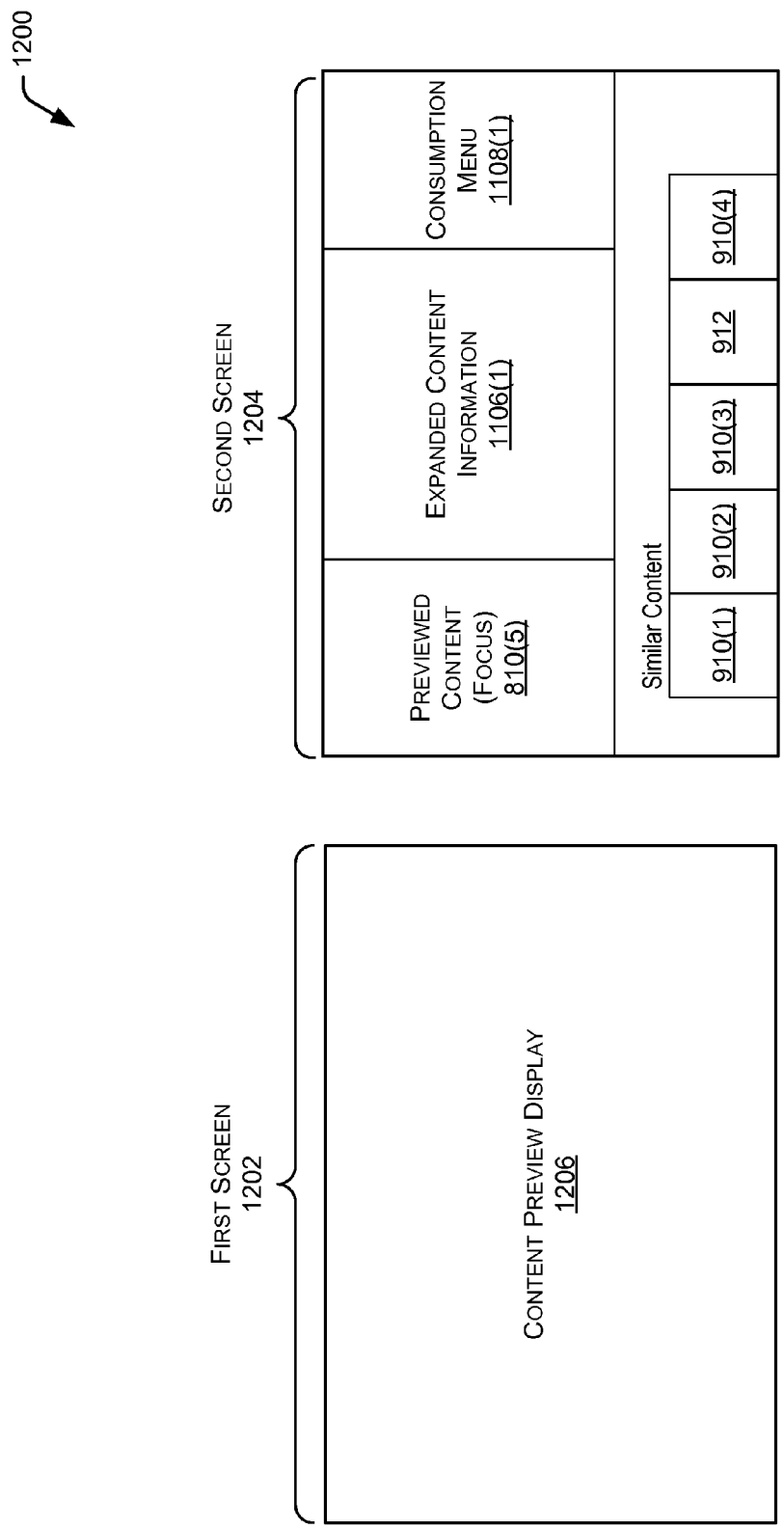
FIG. 12 illustrates a content preview display user interface configured to provide a consumption menu, and a consumption selection confirmation.

FIG. 12 illustrates a content preview display user interface 1200 of the media controller 108. In this illustration two screens are depicted: a first screen 1202 and a second screen 1204.

The first screen 1202 depicts a content preview display 1206. The user 102 may arrive at the content preview display 1206 by selecting one of the pieces of content 104 for presentation, such as the previewed content 810, the similar content 910, and so forth. For example, the content preview display 1206 may be used to present a trailer for a movie or television show. The content preview display 1206 may be configured to present the preview or excerpt of the content free from presentation of elements.

During presentation of the content 104 by the content preview display 1206, the user 102 may provide an input such as pressing the enter button 510(2) on the remote control 114. Responsive to this input, the user interface 1200 may transition to the second screen 1204. In some implementations the transition to the second screen 1204 may occur at the conclusion of the presentation of the content 104 without user intervention. For example, the presentation of the trailer may play to the end, and second screen 1204 may be presented.

In the second screen 1204, the user interface of the first screen 1102 of FIG. 11 may be presented. As described above, this may include the previewed content 810, the expanded content information 1106, the consumption menu 1108, and so forth.

In another implementation, not illustrated, the content preview display 1206 element may be configured to extend from a top edge of the screen to a bottom edge of the screen, and from a left edge of the screen, approximately ⅔ of the screen towards a right edge of the screen. In the remaining ⅓ of the screen, the consumption menu 1108 as described above may be presented. In some implementations, the consumption menu 1108 in this context may provide a subset of the consumption options from those described above in FIG. 11. For example, the consumption elements may include options for playing the content, renting the content, buying access rights to the content, adding the content to a watchlist, or reading or entering reviews about the content.

Upon selecting one of the consumption options which call for a confirmation the user interface 1200 may transition to the consumption selection confirmation 1110, such as shown above in the second screen 1104 of FIG. 11. For example, when the user 102 selects to rent or buy the content, the user interface may transition to the second screen 1104 and prompt the user 102 to confirm the rental or purchase amount.

Figure 13:
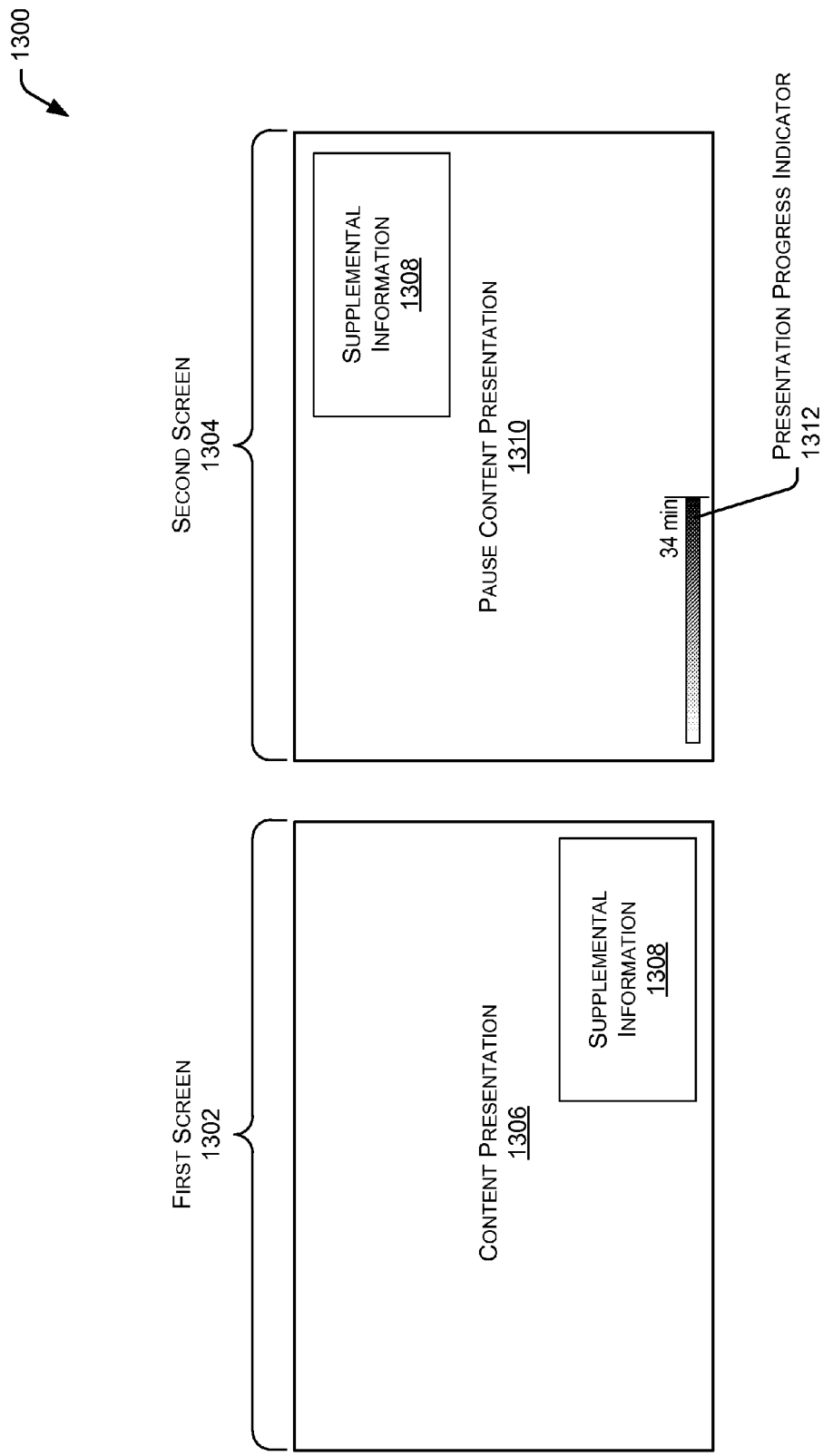
FIG. 13 illustrates a content presentation user interface configured to present supplemental information during a pause in presentation of the content.

FIG. 13 illustrates a content presentation user interface 1300 of the media controller 108. The content presentation user interface 1300 is configured to present the content 104 to the user 102. In this illustration, a first screen 1302 and a second screen 1304 are illustrated.

The content presentation user interface 1300 may be provided after the user 102 selects content 104 for presentation, such as described above with regard to FIG. 12. A content presentation 1306 user interface depicted in the first screen 1302 presents graphical content such as movies or graphics associated with content 104, such as music album cover art, may be configured to fill most or all of the screen. During presentation of the content 104, the user 102 may use the remote control 114 to change the presentation, such as by pausing the presentation of the content 104.

As illustrated in the first screen 1302, the content presentation 1306 may contain the content 104 or images associated with the content 104 and one or more supplemental information elements 1308. The supplemental information 1308 may include information associated with one or more of production, distribution, editing, casting, trivia or other information about or associated with the content 104. The supplemental information 1308 may also include information from a social network or other sources. For example, information about the production of the content 104, news about one of the performers in the content 104, or comments by fans may be provided. The supplemental information element 1308 may remain at a single set of coordinates on the screen, or may be configured to change coordinates and move around the screen. For example, different pieces of trivia may be presented for periods of time. With each change in the trivia presented, the supplemental information 1308 element may move to a new location within the second screen 1304.

In some implementations the supplemental information 1308 may also include games or user feedback. For example, the supplemental information 1308 may include trivia questions to which the user 102 may respond using the remote control 114, or for which the answers are presented after a given interval of time. In this way, the user interface 1300 may encourage the users 102 into ongoing engagement with the content 104 during presentation. In some implementations, the supplemental information 1308 may be omitted during the presentation of the content 1306.

The user 102 may press the play/pause button 510(5) to pause the presentation, resulting in the second screen 1304, which comprises a paused content presentation 1310 user interface, such as shown in the second screen 1304. After a period of time of inaction, or upon the user 102 providing input such as with the remote control 114, the user interface 1304 may present the supplemental information 1308 if previously omitted from the screen, may change the supplemental information 1308, and so forth.

In some implementations a presentation progress indicator 1312 may be provided. The presentation progress indicator 1312 may provide information to the user 102 such as amount of content elapsed, current time within the content, content presentation time remaining, and so forth.

Figure 14:
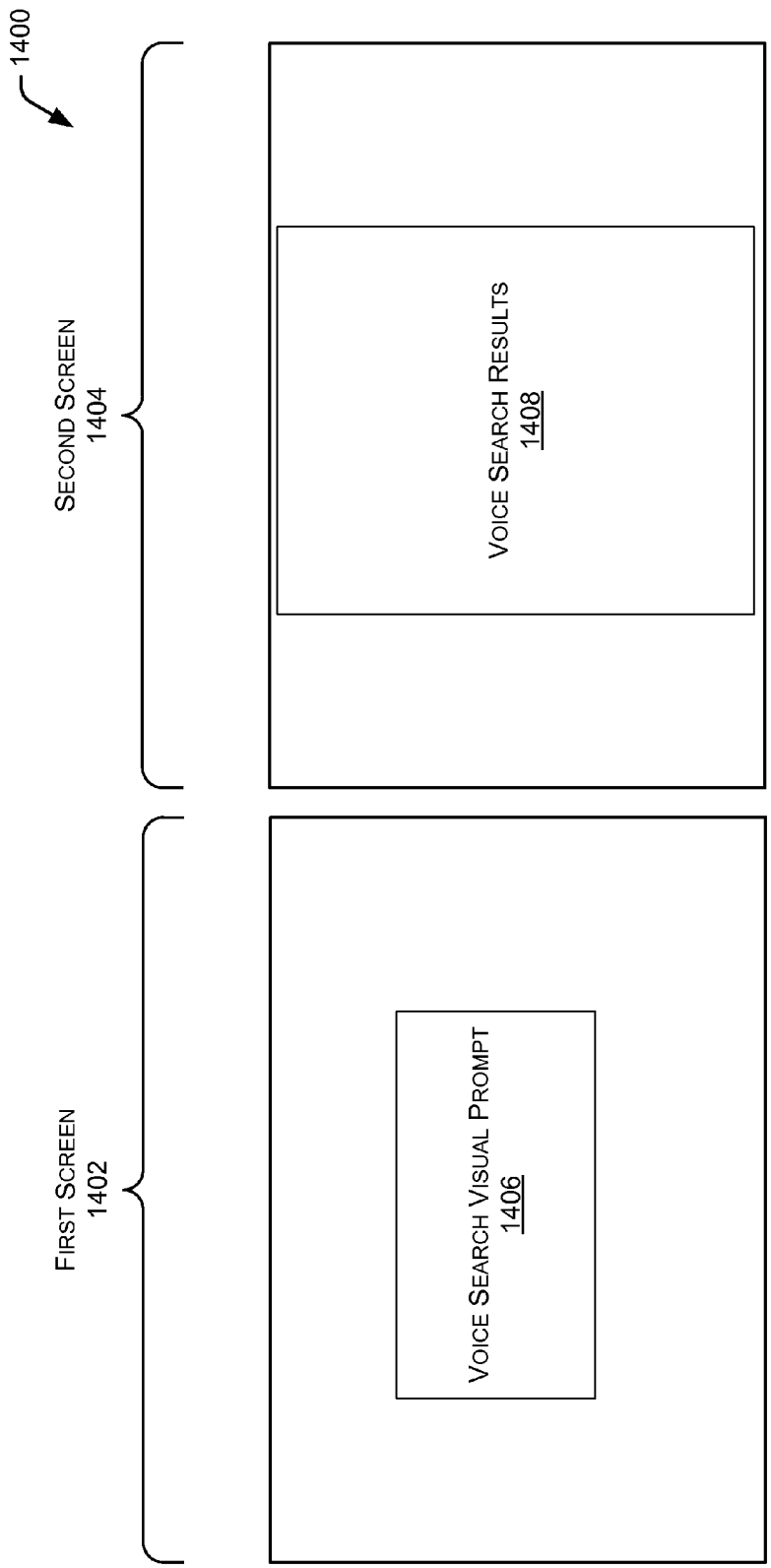
FIG. 14 illustrates a user interface configured to accept speech input.

FIG. 14 illustrates a user interface 1400 of the media controller 108 which is configured to accept speech input. Throughout the user interface 112 described herein, the user 102 may choose to provide input by speaking. The user 102 may initiate this functionality by providing a particular user input. The particular user input may be speaking a particular code phrase or word when the media controller 108 is configured to be continuously monitoring for speech. For example, the code word may be "abracadabra" and when the word is uttered and recognized by the media controller 108, the user interface 1400 may be presented.

The user input may also include input using the remote control 114. In one implementation, the user's 102 activation of the voice button 510(8) may initiate presentation of the user interface 1400 and recognition of speech acquired by the microphone 512. An audio signal of human speech may be acquired by the microphone 512 of the remote control 114. At least a portion of the audio signal may be provided to the one or more processors 402. In another implementation, at least a portion of the audio signal may be provided to the or to one or more servers 120. Using the network interface 410(3), speech data may be received from the one or more servers 120. The speech data may comprise text or other data indicative of words or sounds from the user.

Illustrated here are a first screen 1402 and a second screen 1404. The first screen 1402 depicts a voice search visual prompt 1406 element. The voice search visual prompt 1406 element may include audio, text, pictures, video, and so forth to the user 102 to acknowledge that the system 100 is waiting for speech input. In some implementations the voice search visual prompt 1406 may include instructions for how to use the functionality. For example, text reading "What are you looking for?" may be presented. Or audio may be presented which says to the user 102 "Please say what you are looking for."

The system 100 may process the recognized speech, and based at least in part on the recognized speech may initiate various functions. In one implementation, these functions may include performing a search for content 104. For example, the user 102 may say the name of a piece of content 104 genre to search for.

The second screen 1404 presents a voice search results 1408 element. This element may include one or more pieces of content which have been determined to meet or be associated with the search criteria based at least in part on the user's 102 speech as recognized. For example, the voice search results 1408 may provide a listing of content 104 which meets the user's 102 request for a particular genre. In some implementations, the voice search results 1408 may be presented as one of the other user interface embodiments described above. For example, the content 104 in the results may be provided in the interface 800 described above with respect to FIG. 8.

In some implementations the voice search results 1408 element may include elements allowing for the selection of particular results or the disambiguation of results or the input. For example, where the system 100 has ambiguously recognized a phrase, the user interface 1400 may present different interpretations for selection by the user 102. This selection may be made by input from the remote control 114, speech, or other user input.

Figure 15:
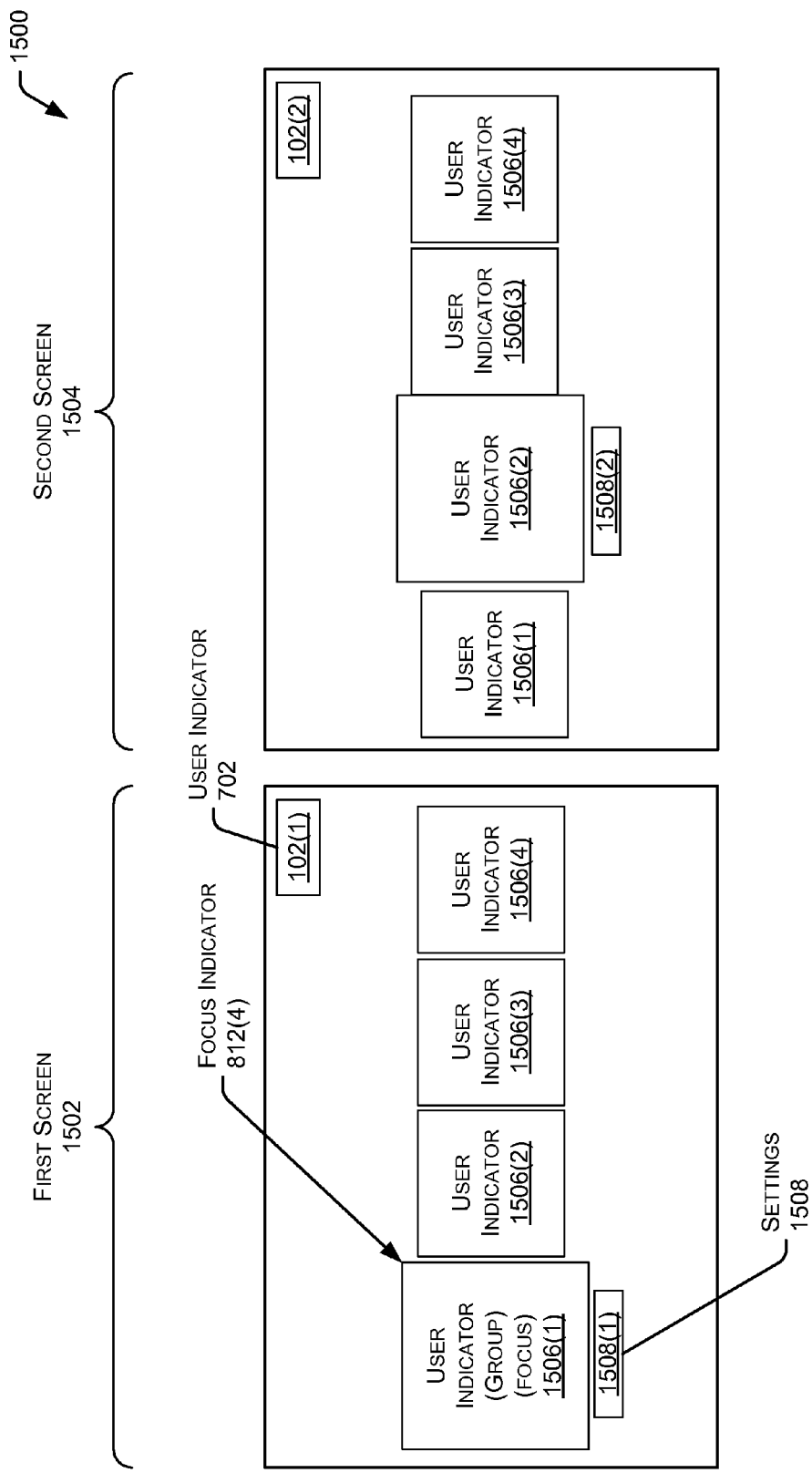
FIG. 15 illustrates a user interface configured to select user groups and user profiles.

FIG. 15 illustrates a user interface 1500 of the media controller 108 configured to select user groups and user profiles. As described above, the user interface 112 may present content, recommendations about content, and other data which vary according to the user 102 who is associated with the user interface 112. The user 102 may be associated with the user interface 112 by one or more of logging into, through voice recognition, facial recognition, or using the user interface 1500 to select a particular user profile.

In this illustration, presented are a first screen 1502 and a second screen 1504. The first screen 1502 presents one or more user indicators 1506. The user indicators 1506 are each associated with different users 102 or groups of users 102. For example, the user indicator 1506(1) is associated with the group user 102(1) comprising the family. Continuing the example, the user indicators 1506(2)-(4) are associated with the users 102(2)-(4).

The first screen 1502 presents the user indicators 1506(1)-(4). The user indicator 1506(1) associated with the family group is illustrated as being in focus with the focus indicator 812(4). The user interface 1500 may present a settings 1508 element for the user indicator 1506 which is in focus. The user 102 may select the settings 1508 element to view or change configuration associated with the user 102. For example, the settings 1508 element may be used by the user 102 to change a method of payment, adjust preferences, change passwords, modify or enter the user's 102 user experience data 124, and so forth.

In the first screen 1502 the user indicator 702 depicts that the user interface 112 is tailored for the currently associated user 102(1). The user 102 may navigate through the available user indicators 1506 and select one.

The second screen 1504 shows the user navigating to the user indicator 1506(2) associated with the user 102(2). The user 102 may select this user indicator 1506 and the associated user experience data 124. For example, as shown here the user 102 has selected the user indicator 1506(2) which is associated with the user 102(2). Once selected, the user interface 112 is updated to present information which is associated with that user. As illustrated here, the user indicator 702 has been adjusted to show the user 102(2) is now the associated user. As described above, the content and other information presented may be adjusted to correspond to the user experience data 124(2) associated with the user 102(2).

Figure 16:
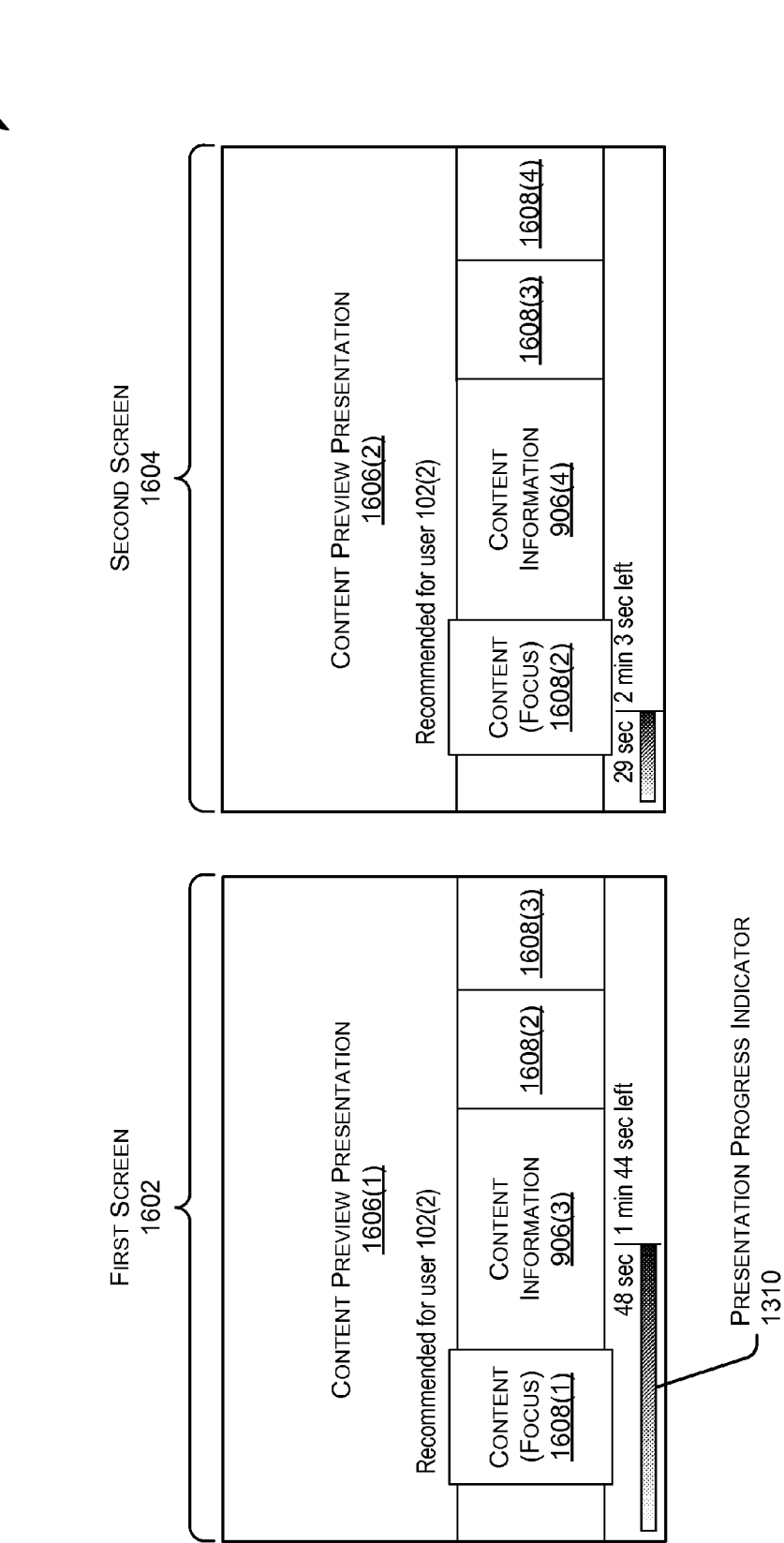
FIG. 16 illustrates a content preview presentation user interface configured to present previews of content.

FIG. 16 illustrates a content preview presentation user interface 1600 of the media controller 108 configured to present previews of content. The content for preview may be selected based on the user experience data 124 of the associated user 102. Continuing the example of FIG. 15, the user 102(2) may have selected their user indicator 1506 from the user interface 1500, so they are now the associated user. As a result, the user interface 112 now provides content 104 for the user 102(2).

In this illustration a first screen 1602 and a second screen 1604 are presented. The first screen 1602 includes a content preview presentation element 1606. The content preview presentation element 1606 may be presented from the left edge of the screen to the right edge of the screen, and extending down from the top edge to approximately the middle of the screen. The content preview presentation 1606 may present video comprising a preview such as a trailer or an excerpt from the content 104.

Content 1608(1)-(3) elements present information about the content 104 which is provided for preview. This information may include thumbnails of promotional graphics, text, icons, and so forth. As described above, pausing or dwelling on a particular content 1608 element may result in presentation of the content information 906 associated with the content 104 which is in focus. For example, as illustrated here the content 1608(1) is in focus, and content information 906(3) is presented. As the user 102 navigates through the content 1608(1)-(3), the content preview presentation 1606 may update to present content 104 which is in focus.

The second screen 1604 illustrates a transition in the user interface 1600 and the content preview presentation 1606 resulting at least in part from the user 102 navigating to select the content 1608(2). The content preview presentation 1606(2) now presents a portion of the content associated with the content 1608(2). As illustrated, the additional content information 906(4) may be shown for the content 1608(2). In some implementations the content information 906 may be presented immediately upon change in focus. For example, the content information 906(3) and (4) may be presented immediately upon the focus changing to the content 1608(1) and 1608(2), respectively, without waiting for implicit or explicit user input.

Other information may also be presented on the first screen 1602 and the second screen 1604, such as the presentation progress indicator 1312. The presentation progress indicator 1310 provides information on the content preview presentation 1606 which is being presented.

Figure 17:
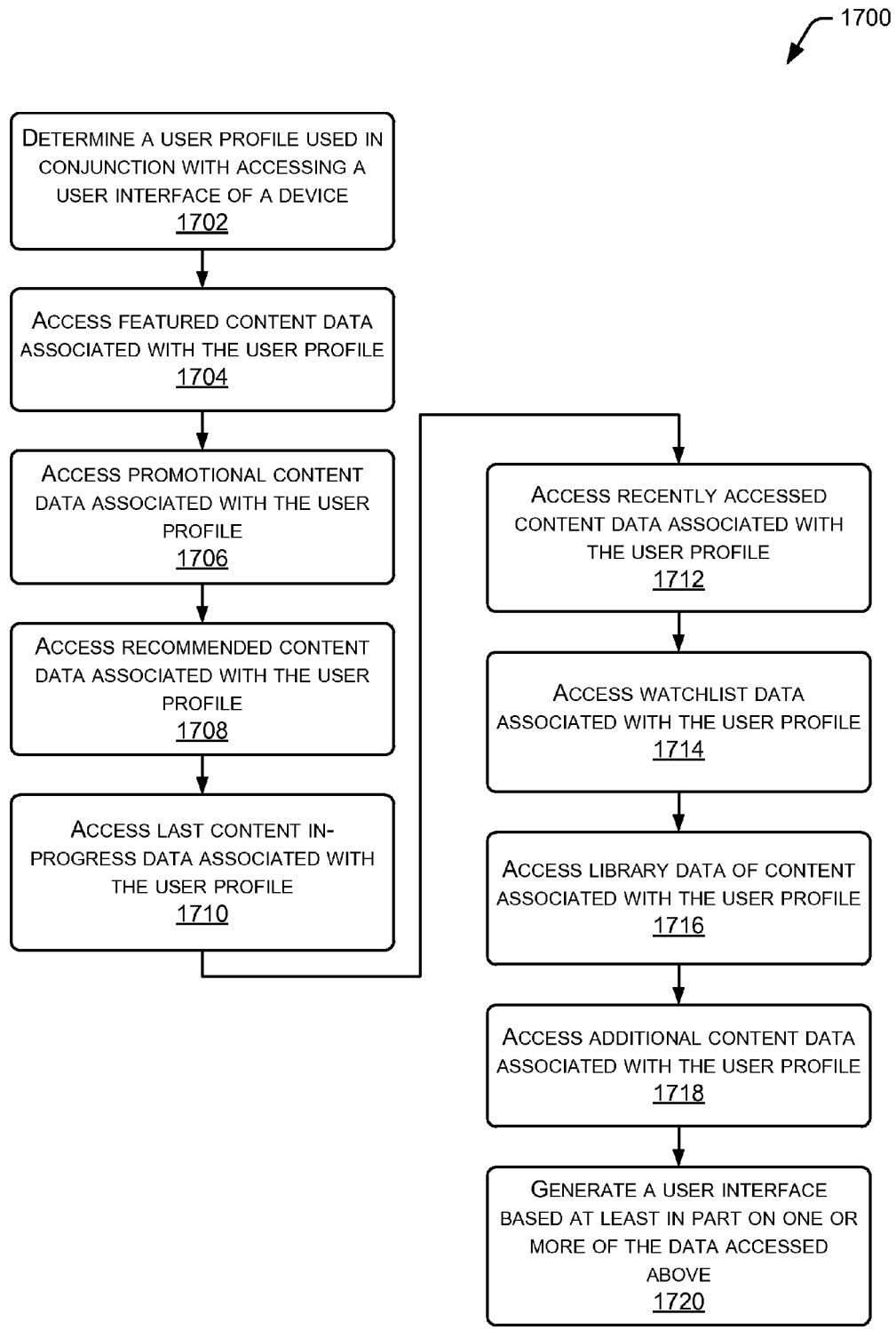
FIG. 17 illustrates a process of configuring the media controller to provide the primary user interface.

FIG. 17 illustrates a process 1700 of configuring the media controller 108 to provide the primary user interface 700. This process may be implemented by the media controller 108, the server 120, or a combination thereof.

Block 1702 determines a user profile used in conjunction with accessing the user interface 112. The user profile may be associated with at least one user 102 or group of users 102. For example, the determined user profile may be for the user 102(2) who has selected their user indicator 1506(2) from the user interface 1500. In other implementations, the determination of the user profile may be based at least in part upon voice recognition, facial recognition, biometric data, login, usage patterns, location, and so forth. For example, the particular selection of content 104 by an undetermined user may be used to select from among user experience data 124 and determine the user associated with the user experience data 124.

Block 1704 accesses the featured content data 302 associated with the user profile. Block 1706 accesses the promotional content data 304 associated with the user profile.

Block 1708 accesses the recommended content data 306 associated with the user profile. Block 1710 accesses the last content in-progress data 308 associated with the user profile. Block 1712 accesses the recently accessed content data 310 associated with the current user or group of users 102.

Block 1714 accesses the watchlist data 312 comprising one or more pieces of content 104 associated with the user profile. Block 1716 accesses the library data 314 of content 104 associated with the user profile. Block 1718 accesses the additional content data 316 associated with the user profile.

Block 1720 generates the user interface 112 based at least in part on one or more of the data accessed above. The user interface 112 may be presented which is based at least in part on one or more of the accessed featured content data 302, the accessed promotional content data 304, the accessed recommended content data 306, the accessed last content in-progress data 308, the accessed recently accessed content data 310, the accessed watchlist data 312, or the accessed library data 314. The generated user interface 112 may be presented on a display device, such as the media device 106. Input responsive to the user interface 112 may be received from the remote control 114 or another device, such as from the communication interface 410.

Figure 18:
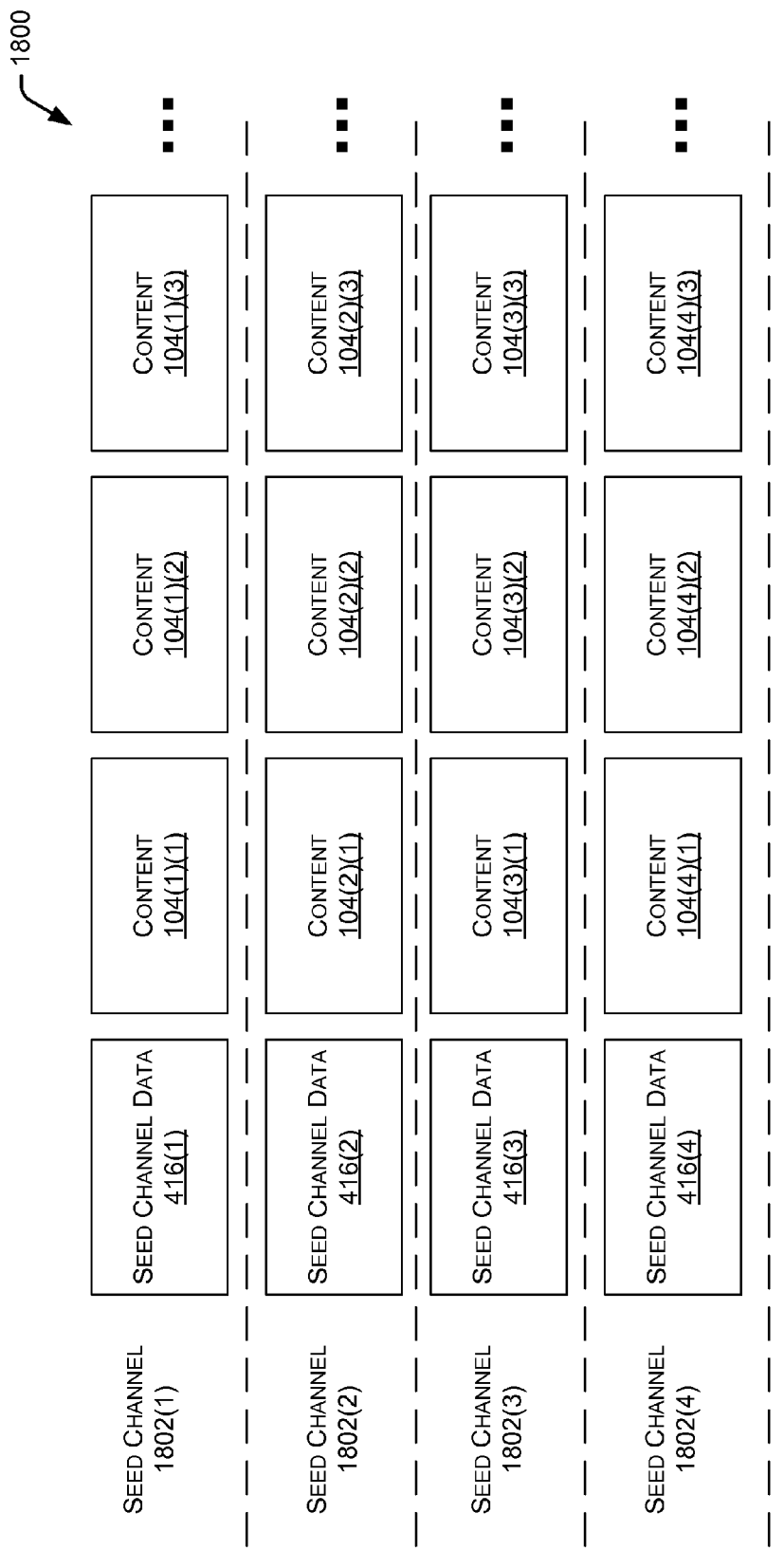
FIG. 18 illustrates a schematic of seed channels based at least in part on seed channel data.

FIG. 18 illustrates a schematic 1800 of seed channels based at least in part on the seed channel data 416. As described above the seed channel data 416 may be based at least in part on the user experience data 124, the user content data 126, and other information. The seed channel data 416 is used to generate one or more seed channels 1802 for presentation. As described above, the seed channel data 416 is information which associates a variety of different pieces of content 104 into a seed channel 1802 for presentation.

In this illustration four seed channels 1802(1)-(4) are presented. Each of these seed channels 1802 may be based at least in part on their respective seed channel data 416(1)-(4). The seed channels 1802 may include for presentation the content 104 or references to the content 104. For example, the seed channel 1802(1) may include links to the pieces of content 104(1)(1), 104(1)(2), 104(1)(3), 104(1)(4), and so on. The pieces of content 104 may be provided by the same content provider or by different content providers. For example, the content provider X may provide 104(1)(1) and 104(1)(3), while content provider Y provides content 104(1)(2), and content provider Z provides the content 104(1)(4).

The user 102 may select different seed channels 1802 for presentation using the user interface 112. A user interface for using the seed channels 1802 is described next with regard to FIG. 19.

Figure 19:
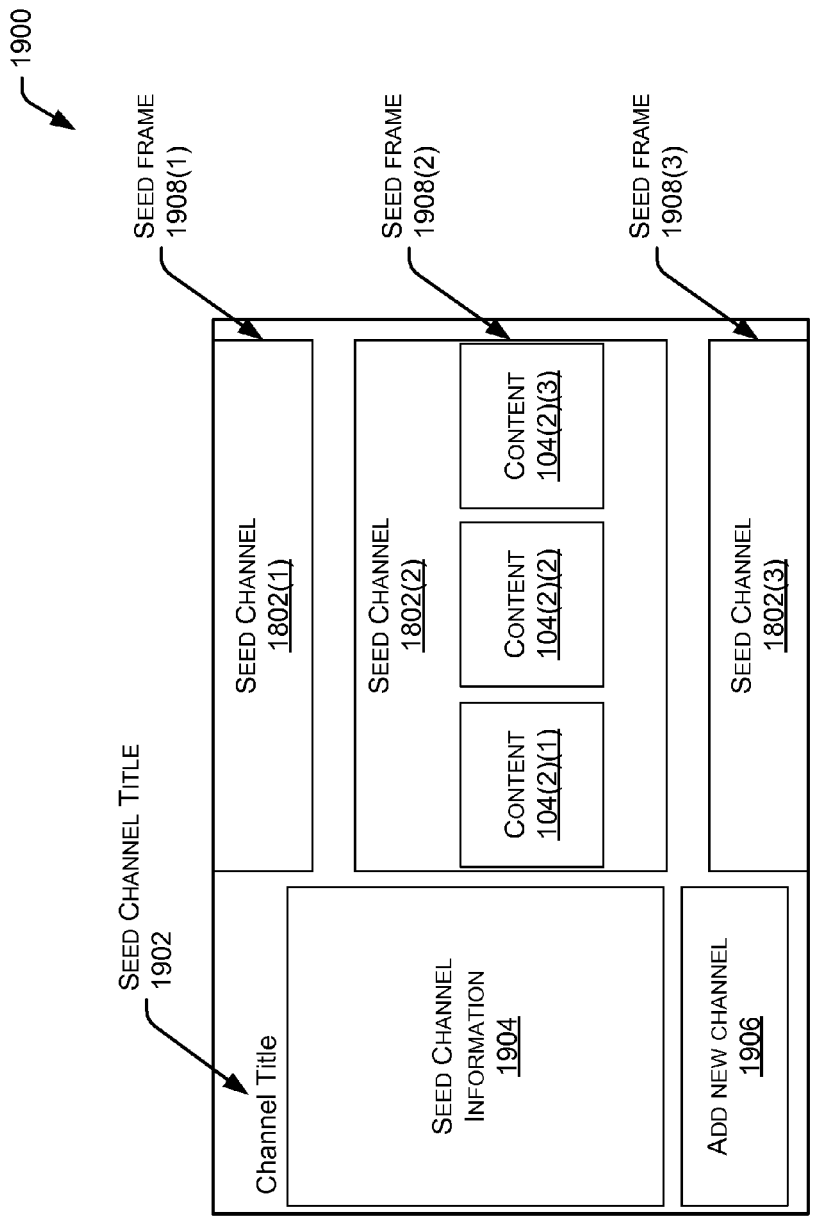
FIG. 19 illustrates a seed channel user interface presenting seed channels and the content associated with those seed channels for selection by the user.

FIG. 19 illustrates a seed channel user interface 1900. The seed channel user interface 1900 may be configured to present one or more seed channels 1802 and the content 104 associated with those seed channels 1802 for selection and consumption by the user 102.

The seed channel user interface 1900 may include elements such as a seed channel title 1902. The seed channel title 1902 may provide text, icons, graphics, and so forth to the user 102 which may be indicative of the content 104 provided in the seed channel 1802.

Seed channel information 1904 may be presented in the user interface 1900. The seed channel information 1904 may include a title such as "Network Comedy" and include network logos, number of shows and episodes available, number of new episodes, and so forth.

The seed channel information 1904 may be arranged adjacent to the seed channel title 1902. In the implementation depicted here, the seed channel information 1904 is arranged under the seed channel title 1902 and above an add new channel 1906 element. The add new channel 1906 allows the user 102 to add a new seed channel. Activation of this element may provide a user interface allowing the user to define elements of the seed channel data 416 for creating a new seed channel, or provide a listing of existing seed channels 1802 for selection.

One or more seed frame 1908 elements may be presented. The seed frames 1908 are configured to present at least a portion of the content associated with the seed channel 1802, or information about or associated with the seed channel 1802. For example, the seed frame 1908 may present an image or video from one of the pieces of content 104 designated in the seed channel 1802. Other information may also be presented in the seed frame 1908, such as title of the content.

In the user interface 1900 illustrated here, three seed frames 1908(1)-(3) are depicted. Each of the seed frames 1908(1)-(3) presents the information about the respective seed channels 1802. For example, seed frame 1908(1) depicts information about the seed channel 1802(1). This information may include details about the content 104 in that seed channel 1802. Continuing the example, the seed frame 1908(2) depicts some of the content 104(2)(1)-104(2)(3) which is associated with the seed channel 1802(2).

The seed frame 1908(2) is arranged to the right of the seed channel information 1904. Above the seed frame 1908(2) is a portion of the seed frame 1908(1). Below the seed frame 1908(2) is a portion of the seed frame 1908(2). These portions of seed frames 1908 may be configured to some information about the respective seed channels 1802, for example a portion of an image still frame, a title, and so forth.

The user interface 1900 may be configured such that the user 102 may navigate through the seed channels 1802 by appearing to scroll or slide through the seed frames 1908. For example, the user 102 may enter a down direction using the directional button 510(1) which results in the presentation of the seed channels 1802 within the seed frames 1908 to appear to roll downward. In this illustration, such an input may shift the seed channel 1802(3) into the central position adjacent to the seed channel information 1904. As the seed channel 1802 presented in the seed frame 1908(2) changes, the seed channel information 1904 may change to present information about that seed channel 1802 in the seed frame 1908(2).

Using the seed channels 1802 and the user interface 1900, the user 102 may easily find content which is of interest and watch with minimal ongoing interaction with the user interface 1900. For example, once the user selects a particular seed channel 1802 for presentation, the content associated with the seed channel 1802 may be presented without further input from the user 102.

The user 102 may navigate between the various user interfaces, or portions thereof, described above. The system 100 may allow the user 102 to follow the sequence set forth as described above to navigate through the various user interfaces, or may provide one or more different sequences to allow the user 102 to arrive at a particular user interface. For example, from the primary user interface 700, the user 102 may utter a speech command which jumps to the user interface 1200 showing the content preview display 1206.

Figure 20:
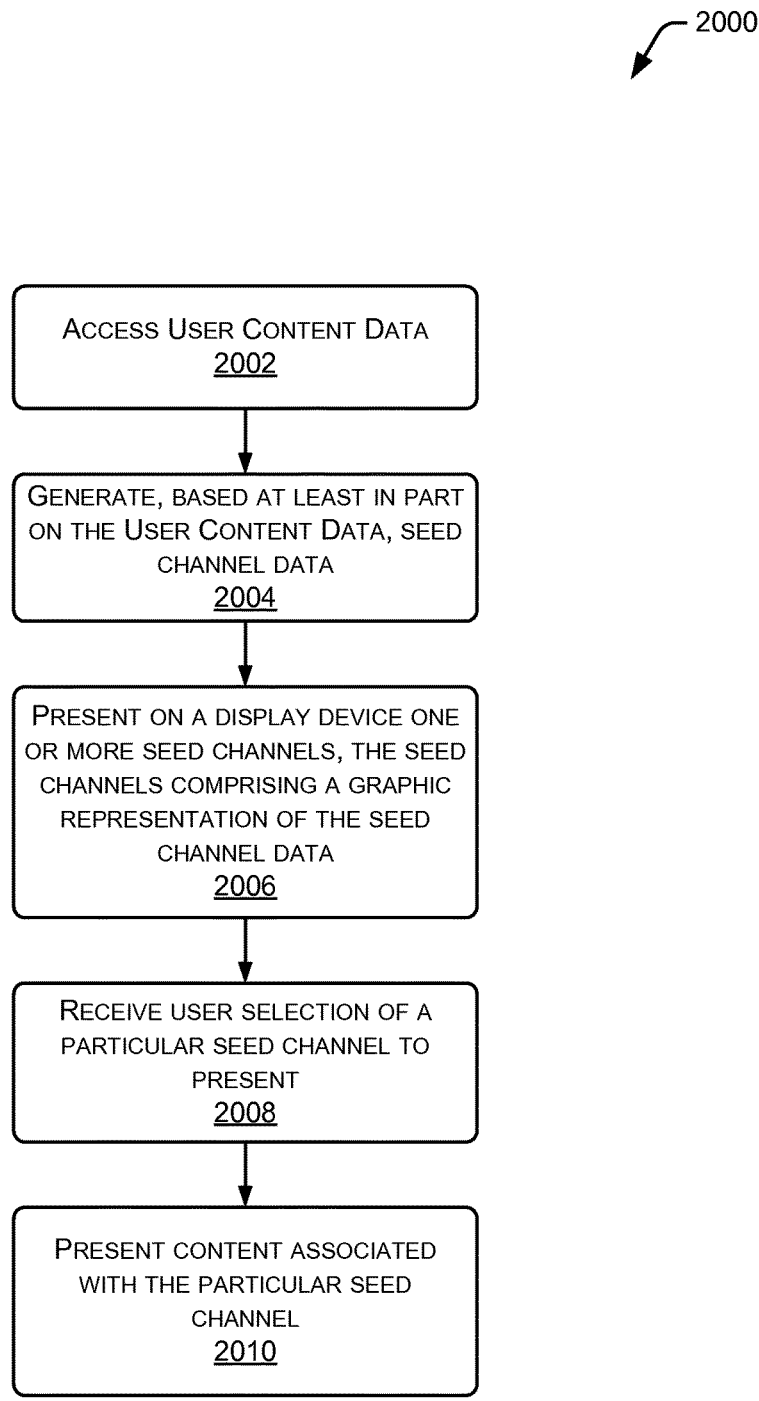
FIG. 20 illustrates a process of generating and presenting one or more seed channels and associated content.

FIG. 20 illustrates a process 2000 of generating and presenting one or more seed channels and associated content. This process may be implemented by the media controller 108, the server 120, or a combination thereof.

Block 2002 accesses the user content data 126. Block 2004 generates, based at least in part on the user content data 126, seed channel data 416. The seed channel data 416 comprises a plurality of pieces of content 104 associated with one another. These pieces of content 104 may be available as a stream provided using a network interface. For example, the content 104 described in the seed channel data 416 for each seed channel may be streamed from a server 120 operated by a particular entity such as a content provider.

As described above with regard to FIG. 18, the seed channel data 416 may be based at least in part on an association with a particular user 102 or group of users 102. The user content data 126 may comprise data specific to the particular user 102 or group of users 102. For example, the seed channel data 416(1) for the user 102(1) may differ from that of the seed channel data 416(2) for the user 102(2) which has different preferences for content.

Block 2006 presents on a display device one or more seed channels 1802. The seed channels 1802 may comprise graphic representations of the seed channel data 416. For example, the seed channels 1802 may include title or promotional data of the content designated in the seed channel data 416.

As described above with regard to FIG. 19, a plurality of the seed frames 1908 may be arranged vertically within the user interface 1900 and one of the plurality of seed channels 1802 may be displayed within each of the seed frames 1908. The seed channels 1802 may comprise a graphic representation of at least a portion of the plurality of pieces of content 102 associated with the seed channel data 416.

Block 2008 receives user selection of a particular seed channel 1802 to present. For example, the user 102 may use the remote control 114 to navigate and select the seed channel 1802(2) for presentation.

Block 2010 presents the content 104 associated with the particular seed channel. Continuing the example, the user interface 112 may display the content 104(2)(1), followed by the content 104(2)(2), then the content 104(2)(3), and so forth.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method for utilizing processing resources of a computerized system to present a user interface, the computer-implemented method comprising:
   determining a first user profile used in conjunction with accessing a first user interface generated by the processing resources, wherein the first user profile is associated with a second user profile;
accessing first data associated with the first user profile and indicative of one or more pieces of first content, the first data comprising:
 first featured content data;
 first promotional content data;
 first recommended content data;
 first last content in-progress data;
 first watchlist data; or
 first library data;
accessing second data associated with the second user profile and indicative of one or more second pieces of content, the second data comprising:
 second featured content data;
 second promotional content data;
 second recommended content data;
 second last content in-progress data;
 second watchlist data; or
 second library data;
generating the first user interface for presentation based at least in part on:
 one or more of:
  the first featured content data;
  the first promotional content data;
  the first recommended content data;
  the first last content in-progress data;
  the first watchlist data; or
  the first library data; and
 one or more of:
  the second featured content data;
  the second promotional content data;
  the second recommended content data;
  the second last content in-progress data;
  the second watchlist data; or
  the second library data;
sending the first user interface to a display device coupled to the processing resources of the computerized system;
receiving input responsive to the first user interface from a communication interface coupled to the processing resources of the computerized system;
determining that a first representation of a first piece of content is in focus in the user interface;
determining a second piece of content that is similar to the first piece of content;
generating a second user interface comprising a second representation of the second piece of content; and
sending a second user interface to the display device.

2. The method of claim 1, wherein the one or more first pieces of content are available from a plurality of different content providers.

3. A device, comprising:
a network interface configured to communicate with one or more servers;
a media device interface configured to communicate with a display device;
at least one memory storing computer-executable instructions; and
at least one processor coupled to the network interface, the media device interface, and configured to access the at least one memory and execute the computer-executable instructions to:
 receive user content data from the one or more servers, wherein the user content data comprises information about one or more pieces of content available from a plurality of content providers, the user content data including recommended content data comprising:
  a first indication of a first piece of content determined to be of interest based on a first user profile, wherein the first user profile includes first experience data associated with a first user; and
  a second indication of a second piece of content determined to be of interest based on a second user profile, wherein the second user profile includes second experience data associated with a second user;
 generate a first user interface based at least in part on the user content data, the first user interface comprising:
  a first representation of the first piece of content; and
  a second representation of the second piece of content;
 send first graphic data associated with the first user interface to the display device using the media device interface;
 perform one or more actions based at least in part on received input;
 determine that the first representation is in focus in the user interface;
 determine a third piece of content that is similar to the first piece of content;
 generate a second user interface comprising a third representation of the third piece of content; and
 send second graphic data associated with the second user interface to the display device.

4. The device of claim 3, wherein the display device is integrated into a common enclosure of the device.

5. The device of claim 3, further comprising an enclosure within which the network interface, the media device interface, the display device, the at least one memory, and the at least one processor are arranged.

6. The device of claim 3, wherein the display device is external to the device.

7. The device of claim 3, further comprising an enclosure within which the network interface, the media device interface, the at least one memory, and the at least one processor are arranged, and wherein the display device is external to the enclosure.

8. The device of claim 3, wherein the at least one processor is configured to perform the one or more actions by accessing the at least one memory to:
 generate a third user interface based at least in part on the received input and send third graphic data associated with the third user interface to the display device using the media device interface.

9. The device of claim 3, wherein the at least one processor is configured to perform the one or more actions by accessing the at least one memory to send the first piece of content to the display device using the media device interface.

10. The device of claim 3, the user content data comprising one or more of:
 promotional content data comprising indications of one or more pieces of advertised content,
 last content in-progress data comprising indications of a piece of content previously presented but for which presentation has been completed or terminated,
 recently accessed content data comprising indications of one or more pieces of content previously accessed by the first user profile or the second user profile,
 watchlist data comprising a list indicating one or more pieces of content for presentation, library data comprising indications of one or more pieces of content for which the user profile has previously acquired access rights allowing presentation, or preview content data comprising indications of a portion of one or more pieces of content.

11. The device of claim 3, wherein the user content data is associated with the first user profile and the second user profile.

12. The device of claim 3, the computer-executable instructions further executed to:

generate a home menu comprising one or more controls to:
  access video content,
  access audio content,
  access image content,
  access game content,
  access application content,
  access user profiles,
  change user mode, or
  change settings on the device; and
send third graphic data associated with the home menu to the display device using the media device interface.

13. The device of claim 3, wherein the user interface comprises a representation of a collection of related pieces of content.

14. The device of claim 13, wherein the related pieces of content are related by one or more attributes, the attributes comprising subject, title, author, cast, crew, series, genre, or rating.

15. The device of claim 13, wherein the representation comprises a gridded arrangement of images associated with the related pieces of content.

16. The device of claim 3, the computer-executable instructions further executed to:

access content information associated with content which is in focus in the user interface;
generate a representation of content information associated with the content which is in focus; and
send third graphic data associated with the representation of content information to the display device using the media device interface.

17. The device of claim 3, the computer-executable instructions further executed to:

generate a representation of a consumption menu comprising controls associated with one or more options, the options comprising watching a trailer, renting, buying, adding to a watchlist, or presenting reviews; and
send third graphic data associated with the representation of the consumption menu to the display device using the media device interface.

18. The device of claim 17, wherein the one or more options are further associated with a particular content provider configured to stream the one or more pieces of content to the device using the network interface.

19. The device of claim 3, wherein the received user input comprises data indicative of a pause in the presentation of the first piece of content, the computer-executable instructions further executed to:

access supplemental information associated with the first piece of content;
generate a supplemental information representation comprising at least a portion of the supplemental information; and
send third graphic data associated with the supplemental information representation overlaid on at least a portion of the first piece of content to the display device using the media device interface.

20. The device of claim 19, wherein the supplemental content comprises information associated with one or more of production, distribution, editing, or casting of the piece of content.

21. The device of claim 3, further comprising:

a communication interface coupled to the at least one processor and configured to communicate with a remote control input device; and wherein the instructions are further configured to receive the input from the remote control input device using the communication interface.

22. The device of claim 21, the computer-executable instructions further executed to:

receive, using the communication interface, an audio signal of human speech acquired by a microphone of the remote control input device;
provide, to the one or more servers using the network interface, at least a portion of the audio signal;
receive, from the one or more servers using the network interface, speech data from the one or more servers, wherein the speech data is based on the at least a portion of the audio signal; and
wherein the received input comprises the speech data.

23. The device of claim 3, wherein the at least one processor is configured to determine that the first representation is in focus in the user interface by executing the computer-executable instructions to determine that the first representation has changed in size or shape.

24. A computer-implemented method for presenting a user interface, the computer-implemented method comprising:

accessing user content data, wherein the user content data comprises information about one or more pieces of content available from a plurality of content providers, the user content data including recommended content data comprising:
  a first indication of a first piece of content determined to be of interest based on a first user profile, wherein the first user profile includes first experience data associated with a first user; and
  a second indication of a second piece of content determined to be of interest based on a second user profile, wherein the second user profile includes second experience data associated with a second user;
generating a first user interface based at least in part on the user content data, the first user interface comprising:
  a first representation of the first piece of content; and
  a second representation of the second piece of content;
sending first graphic data associated with the first user interface to the display device using the media device interface;
performing one or more actions based at least in part on received input;
determining that the first representation is in focus in the user interface;
determining a third piece of content that is similar to the first piece of content;
generating a second user interface comprising a third representation of the third piece of content; and
sending second graphic data associated with the second user interface to the display device.

25. The computer-implemented method of claim 24, comprising:

accessing content information associated with content which is in focus in the user interface;

generating a representation of content information associated with the content which is in focus; and sending third graphic data associated with the representation of content information to the display device using the media device interface.

26. The computer-implemented method of claim 24, comprising:

generating a representation of a consumption menu comprising controls associated with one or more options, the options comprising watching a trailer, renting, buying, adding to a watchlist, or presenting reviews; and sending third graphic data associated with the representation of the consumption menu to the display device using the media device interface.

27. The computer-implemented method of claim 26, wherein the options are further associated with a particular content provider configured to stream the one or more pieces of content to the device using the network interface.

* * * * *